US012604268B2

(12) United States Patent
Xue et al.

(10) Patent No.: US 12,604,268 B2
(45) Date of Patent: Apr. 14, 2026

(54) SIGNAL MONITORING METHOD AND APPARATUS

(71) Applicant: HUAWEI TECHNOLOGIES CO., LTD., Shenzhen (CN)

(72) Inventors: Yifan Xue, Beijing (CN); Jian Wang, Beijing (CN); Yu Cai, Shenzhen (CN); Xiaocui Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 293 days.

(21) Appl. No.: 18/454,385

(22) Filed: Aug. 23, 2023

(65) Prior Publication Data

US 2023/0397113 A1      Dec. 7, 2023

Related U.S. Application Data

(63) Continuation of application No. 17/263,085, filed as application No. PCT/CN2019/099954 on Aug. 9, 2019, now Pat. No. 11,910,317.

(30) Foreign Application Priority Data

Aug. 10, 2018      (CN) ........................ 201810911876.X
Aug. 17, 2018      (CN) ........................ 201810939005.9

(51) Int. Cl.
*H04W 52/02*          (2009.01)
*H04W 76/28*          (2018.01)

(52) U.S. Cl.
CPC ....... *H04W 52/0229* (2013.01); *H04W 76/28* (2018.02)

(58) Field of Classification Search
CPC ... H04L 5/0053; H04L 5/0078; H04L 5/0091; H04W 52/0216; H04W 52/0229; H04W 52/0235; H04W 76/28; Y02D 30/70
See application file for complete search history.

(56) References Cited

U.S. PATENT DOCUMENTS

2009/0154607 A1      6/2009   Lindoff et al.
2010/0080187 A1      4/2010   Papasakellariou et al.
(Continued)

FOREIGN PATENT DOCUMENTS

CN         103636264 A      3/2014
CN         107295687 A      10/2017
(Continued)

OTHER PUBLICATIONS

Qualcomm Incorporated, "Advanced Grant Indication for UE Power Saving," 3GPP TSG RAN WG1 #91, R1-1720709, Reno, NV, USA, Nov. 27-Dec. 1, 2017, 5 pages.
(Continued)

*Primary Examiner* — Amr A Awad
(74) *Attorney, Agent, or Firm* — Fish & Richardson P.C.

(57)          ABSTRACT

This application provides a signal monitoring method and an apparatus. An example method includes: detecting a second signal in a downlink signal, where the second signal is a first type of signal, and the first type of signal is a downlink control information (DCI) and the first type of signal indicates power consumption reduction information; and determine, based on the second signal and a mapping relationship between at least one bit value in the first type of signal and at least one meaning of the power consumption reduction information, a meaning of power consumption reduction information indicated by the second signal, wherein the meaning of power consumption reduction information indicated by the second signal is one of at least one meaning of the power consumption reduction information in the mapping relationship.

15 Claims, 14 Drawing Sheets

(56) References Cited

U.S. PATENT DOCUMENTS

| | | | | |
|---|---|---|---|---|
| 2014/0071957 | A1 | 3/2014 | Xu et al. | |
| 2015/0215868 | A1 | 7/2015 | Xu | |
| 2018/0097598 | A1 | 4/2018 | Ang et al. | |
| 2018/0098334 | A1* | 4/2018 | Tie | H04W 72/12 |
| 2018/0359762 | A1* | 12/2018 | Xiong | H04L 5/14 |
| 2020/0120606 | A1 | 4/2020 | Beale et al. | |

FOREIGN PATENT DOCUMENTS

| | | |
|---|---|---|
| CN | 107889268 A | 4/2018 |
| CN | 108307495 A | 7/2018 |
| CN | 109257823 A | 1/2019 |
| CN | 110830198 A | 2/2020 |
| EP | 2605442 A2 | 6/2013 |
| WO | 2016164202 A1 | 10/2016 |
| WO | 2018169649 A1 | 9/2018 |

OTHER PUBLICATIONS

LG Electronics, "Discussion on wake up signal in MTC," 3GPP TSG RAN WG1 Meeting #92, R1-1802163, Athens, Greece, Feb. 26-Mar. 2, 2018, 8 pages.

Asustek, "Remaining issues for SFI," 3GPP TSG RAN WG1 Meeting #93, R1-1806913, Busan, Korea, May 21-25, 2018, 6 pages.

Office Action in Korean Appln. No. 10-2021-7002896, mailed on Sep. 22, 2023, 12 pages (with English translation).

3GPP TS 38.213 V15.2.0 (Jun. 2018), "3rd Generation Partnership Project; Technical Specification Group Radio Access Network;NR;Physical layer procedures for control(Release 15)," Jun. 2018, 99 pages.

3GPP TS 38.321 V15.2.0 (Jun. 2018),: 3rd Generation Partnership Project; Technical Specification Group Radio Access Network;NR;Medium Access Control (MAC) protocol specification(Release 15), Jun. 2018, 73 pages.

3GPP TS 38.331 V15.2.1 (Jun. 2018), "3rd Generation Partnership Project; Technical Specification Group Radio Access Network; NR;Radio Resource Control (RRC) protocol specification(Release 15)," Jun. 2018, 303 pages.

Apple Inc., "Control Information for UE Power Saving," 3GPP TSG RAN WG1 Meeting NR #3, R1-1716553, Nagoya, Japan, Sep. 18-21, 2017, 6 pages.

Ericsson, "DRX with short on Duration and Wake-up signaling," 3GPP TSG-RAN WG2 #101, R2-1803189, Athens, Greece, Feb. 26-Mar. 2, 2018, 3 pages.

Ericsson, "DRX with short on-Duration and Wake-up signaling," 3GPP TSG-RAN WG2 #103, R2-1811627, Resubmission of R2-1810058, Gothenburg, Sweden, Aug. 20-24, 2018, 3 pages.

Ericsson, ST-Ericsson, "DSI for short sessions in LTE MBMS," 3GPP TSG-RAN WG2 #67bis, R2-095790, Miyazaki, Japan, Oct. 12-16, 2009, 6 pages.

Extended European Search Report issued in European Application No. 19846979.3 on Aug. 13, 2021, 6 pages.

Huawei et al., "Feature lead summary of Wake-up signal configurations and procedures in NB-IoT," 3GPP TSG RAN WG1 Meeting #93, R1-1807471, Busan, Korea, May 21-25, 2018, 18 pages.

Huawei et al., "Power saving signal or channel in NB-IoT," 3GPP TSG-RAN WG2 Meeting #99, R2-1708301, Berlin, Germany, Aug. 21-25, 2017, 4 pages.

LG Electronics, "Discussion on power saving signal/channel function," 3GPP TSG RAN WG1 Meeting 90bis, R1-1717272, Prague, CZ, 9-13, Oct. 2017, 8 pages.

Nokia et al., "Considerations for design of wake-up signal," 3GPP TSG RAN WG1 Meeting #90bis, R1-1717228, Prague, Czech Republic, Oct. 9-13, 2017, 4 pages.

Office Action in Chinese Appln. No. 202210252489.6, dated Nov. 15, 2022, 14 pages (with English translation).

Office Action issued in Chinese Application No. 201810939005.9 on Apr. 3, 2020, 12 pages (with English translation).

Office Action issued in Chinese Application No. 202110656579.7 on Mar. 25, 2022, 15 pages (with English translation).

Office Action issued in Japanese Application No. 2021-506996 on Apr. 5, 2022, 10 pages (with English translation).

PCT International Search Report and Written Opinion issued in International Application No. PCT/CN2019/099954 on Oct. 30, 2019, 14 pages (with English translation).

Extended European Search Report in European Appln No. 23210055.2, dated Jun. 10, 2024, 9 pages.

* cited by examiner

Network
device

Terminal
device

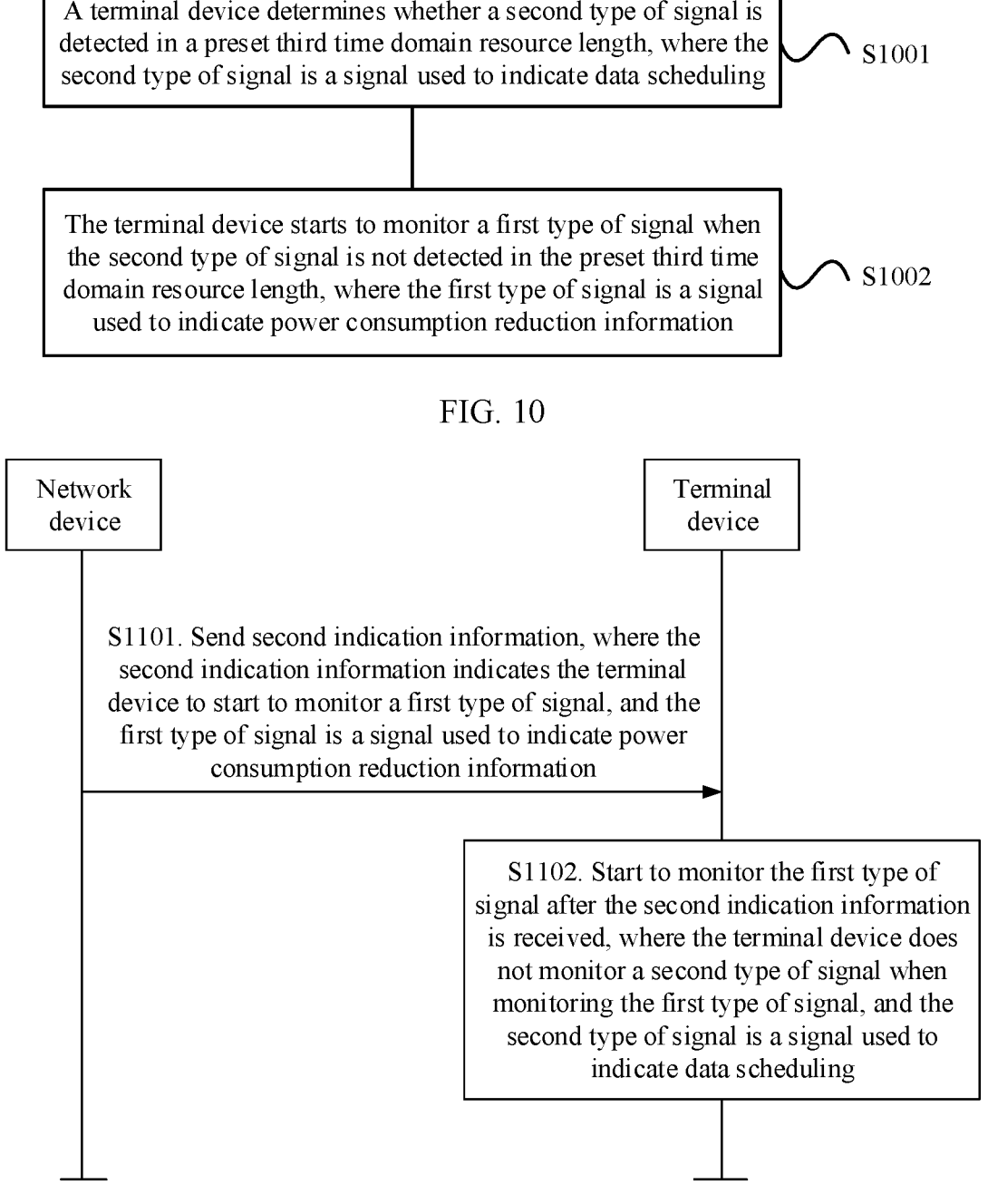

A terminal device determines whether a second type of signal is detected in a preset third time domain resource length, where the second type of signal is a signal used to indicate data scheduling          S1001

The terminal device starts to monitor a first type of signal when the second type of signal is not detected in the preset third time domain resource length, where the first type of signal is a signal used to indicate power consumption reduction information          S1002

FIG. 10

Network device

Terminal device

S1101. Send second indication information, where the second indication information indicates the terminal device to start to monitor a first type of signal, and the first type of signal is a signal used to indicate power consumption reduction information S1102. Start to monitor the first type of signal after the second indication information is received, where the terminal device does not monitor a second type of signal when monitoring the first type of signal, and the second type of signal is a signal used to indicate data scheduling

FIG. 11

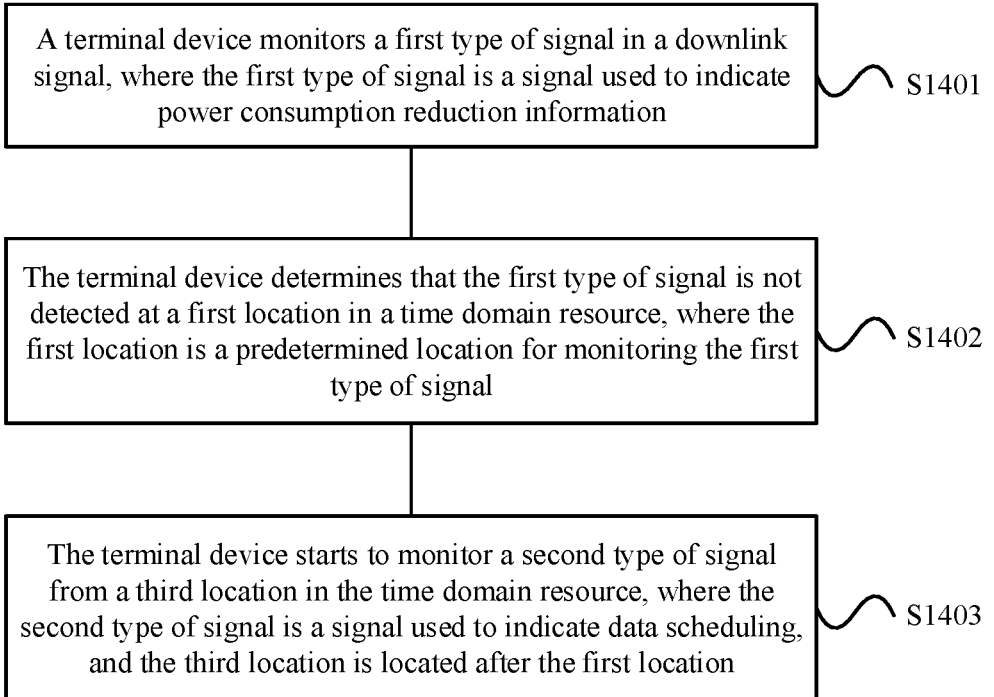

A terminal device monitors a first type of signal in a downlink signal, where the first type of signal is a signal used to indicate power consumption reduction information — S1401

The terminal device determines that the first type of signal is not detected at a first location in a time domain resource, where the first location is a predetermined location for monitoring the first type of signal — S1402

The terminal device starts to monitor a second type of signal from a third location in the time domain resource, where the second type of signal is a signal used to indicate data scheduling, and the third location is located after the first location — S1403

FIG. 14

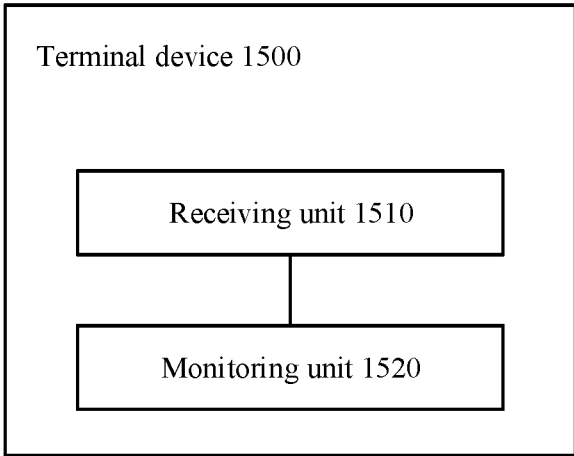

Terminal device 1500

Receiving unit 1510

Monitoring unit 1520

FIG. 15

SIGNAL MONITORING METHOD AND APPARATUS

CROSS-REFERENCE TO RELATED APPLICATIONS

This application is a continuation of U.S. patent application Ser. No. 17/263,085, filed on Jan. 25, 2021, which is a national stage of International Application No. PCT/CN2019/099954, filed on Aug. 9, 2019, which claims priority to Chinese Patent Application No. 201810939005.9, filed on Aug. 17, 2018, and Chinese Patent Application No. 201810911876 X, filed on Aug. 10, 2018. All of the aforementioned applications are hereby incorporated by reference in their entireties.

TECHNICAL FIELD

This application relates to the communications field, and in particular, to a signal monitoring method and an apparatus.

BACKGROUND

In a communications system, a terminal device needs to monitor a downlink signal to obtain control information sent to the terminal device. For example, the control information may be downlink control information (DCI). The terminal device needs to decode signals by using different DCI formats in blind detection, and more DCI formats that need to be used in blind detection indicate higher power consumption of the terminal device. With development of technologies, a quantity of signals that need to be monitored by the terminal device becomes larger. Consequently, signal monitoring complexity and power consumption of the terminal device also increased.

SUMMARY

This application provides a signal monitoring method, an apparatus, and a system, to reduce power consumption of a terminal device.

According to a first aspect, a signal monitoring method is provided, including: receiving, by a terminal device, a downlink signal; and monitoring, by the terminal device, a first type of signal in the downlink signal, where the first type of signal is a signal used to indicate power consumption reduction information, the terminal device does not monitor a second type of signal when monitoring the first type of signal, and the second type of signal is a signal used to indicate data scheduling.

In this embodiment of this application, a network device does not send the second type of signal when sending the first type of signal. Therefore, the terminal device does not need to monitor the first type of signal and the second type of signal at the same time. In this monitoring manner, types of signals monitored by the terminal device at the same time can be reduced, so as to reduce power consumption of the terminal device.

With reference to the first aspect, in a first implementation of the first aspect, the monitoring, by the terminal device, a first type of signal in the downlink signal includes: detecting, by the terminal device, a first signal, where the first signal is the first type of signal; and the method further includes: determining, by the terminal device, a location of a next to-be-monitored signal in a time domain resource based on the first signal, where the next to-be-monitored signal is the first type of signal or the second type of signal.

With reference to the first implementation of the first aspect, in a second implementation of the first aspect, the first signal indicates that data scheduling is not performed in a first time domain resource length, and the determining, by the terminal device, a location of a next to-be-monitored signal in a time domain resource based on the first signal includes: starting, by the terminal device, to monitor the first type of signal from a location after the first time domain resource length in the time domain resource.

With reference to the first implementation of the first aspect, in a third implementation of the first aspect, the first signal indicates that data scheduling can be performed after a second time domain resource length, and the determining, by the terminal device, a location of a next to-be-monitored signal in a time domain resource based on the first signal includes: starting, by the terminal device, to monitor the second type of signal from a location after the second time domain resource length in the time domain resource.

With reference to the first implementation of the first aspect, in a fourth implementation of the first aspect, the method further includes: receiving, by the terminal device, first indication information, where the first indication information indicates that a first location in the time domain resource is an uplink location, the first location is the location of the next to-be-monitored signal that is determined based on the first signal, and the next to-be-monitored signal is the first type of signal; and monitoring, by the terminal device, the first type of data at at least one second location in the time domain resource, where the at least one second location is located after the first location.

In this embodiment of this application, when a location for monitoring the first type of signal conflicts with a slot structure or an uplink-downlink configuration, the terminal device may monitor the first type of data at a location after the first location in the time domain resource, so as to provide a solution in a conflict scenario, thereby improving monitoring efficiency.

With reference to the first implementation of the first aspect, in a fifth implementation of the first aspect, the monitoring, by the terminal device, a first type of signal in the downlink signal includes: determining, by the terminal device, that the first type of signal is not detected at a first location in the time domain resource, where the first location is the location of the next to-be-monitored signal that is determined based on the first signal, and the next to-be-monitored signal is the first type of signal; and the method further includes: starting, by the terminal device, to monitor the second type of signal from a third location in the time domain resource, where the third location is located after the first location.

In this embodiment of this application, when the terminal device does not detect the first type of signal at the predetermined location, the terminal device may immediately monitor the second type of signal after the first location, so as to avoid missing detection of a signal, thereby improving communication efficiency.

With reference to the first aspect, in a sixth implementation of the first aspect, the monitoring, by the terminal device, a first type of signal in the downlink signal includes: periodically monitoring, by the terminal device, the first type of signal.

With reference to the sixth implementation of the first aspect, in a seventh implementation of the first aspect, the method further includes: receiving, by the terminal device, first indication information, where the first indication information indicates that a first location in a time domain resource is an uplink location, and the first location is a location for periodically monitoring the first type of signal; and determining, by the terminal device, not to monitor the first type of signal at a location between the first location and a next location for periodically monitoring the first type of signal.

With reference to the sixth implementation of the first aspect, in an eighth implementation of the first aspect, the method further includes: receiving, by the terminal device, first indication information, where the first indication information indicates that a first location in a time domain resource is an uplink location; and monitoring, by the terminal device, the first type of data at at least one second location in the time domain resource, where the first location is a location for periodically monitoring the first type of signal, and the at least one second location is located after the first location.

With reference to the sixth implementation of the first aspect, in a ninth implementation of the first aspect, the monitoring, by the terminal device, a first type of signal in the downlink signal includes: determining, by the terminal device, that the first type of signal is not detected at a first location in a time domain resource, where the first location is a location for periodically monitoring the first type of signal; and the method further includes: starting, by the terminal device, to monitor the second type of signal from a third location in the time domain resource, where the third location is located after the first location.

With reference to any one of the first aspect or the foregoing implementations of the first aspect, in a tenth implementation of the first aspect, before the monitoring, by the terminal device, a first type of signal in the downlink signal, the method further includes: determining, by the terminal device, whether the second type of signal is detected in a preset third time domain resource length; and starting, by the terminal device, to monitor the first type of signal when the second type of signal is not detected in the preset third time domain resource length.

In this embodiment of this application, when the network device does not send the second type of signal in the preset third time domain resource length, it indicates that the network device is to send the first type of signal. Therefore, the terminal device may monitor the first type of signal after the third time domain resource length, and the network device does not need to additionally send indication information that indicates to start to monitor the first type of signal, so as to reduce signaling overheads.

With reference to any one of the first aspect or the foregoing implementations of the first aspect, in an eleventh implementation of the first aspect, before the monitoring, by the terminal device, a first type of signal in the downlink signal, the method further includes: receiving, by the terminal device, second indication information, where the second indication information indicates the terminal device to start to monitor the first type of signal; and starting, by the terminal device, to monitor the first type of signal after receiving the second indication information.

With reference to the eleventh implementation of the first aspect, in a twelfth implementation of the first aspect, the second indication information is carried in any one of the following: RRC signaling, a MAC CE, and DCI.

With reference to any one of the first aspect or the foregoing implementations of the first aspect, in a thirteenth implementation of the first aspect, the first type of signal is used to indicate any one of the following: data scheduling is not performed in a first time domain resource length; and data scheduling can be performed after a second time domain resource length.

With reference to any one of the first aspect or the foregoing implementations of the first aspect, in a fourteenth implementation of the first aspect, the first type of signal is any one of the following: DCI, a sequence, and a reference signal; or the second type of signal is DCI.

According to a second aspect, a signal sending method is provided, including: generating, by a network device, a downlink signal, where the downlink signal includes a first type of signal or a second type of signal that is to be monitored by a terminal device, the network device sends only one of the first type of signal and the second type of signal in a same time interval, the first type of signal is a signal used to indicate power consumption reduction information, and the second type of signal is a signal used to indicate data scheduling; and sending, by the network device, the downlink signal.

With reference to the second aspect, in a first possible implementation of the second aspect, the downlink signal includes a first signal, the first signal is the first type of signal, the first signal is used to determine a location, in a time domain resource, of a next signal to be monitored by the terminal device, and the next signal to be monitored by the terminal device is the first type of signal or the second type of signal.

With reference to the first possible implementation of the second aspect, in a second possible implementation of the second aspect, the method further includes: sending, by the network device, first indication information, where the first indication information indicates that a first location in the time domain resource is an uplink location, the first location is the location that is of the next signal to be monitored by the terminal device and that is determined based on the first signal, and the next signal to be monitored by the terminal device is the first type of signal; and sending, by the network device, the first type of signal at a second location in the time domain resource, where the second location is located after the first location.

With reference to the second aspect, in a third possible implementation of the second aspect, the sending, by the network device, the downlink signal includes: periodically sending, by the network device, the first type of signal.

With reference to the third possible implementation of the second aspect, in a fourth possible implementation of the second aspect, the method further includes: sending, by the network device, first indication information, where the first indication information indicates that a first location in the time domain resource is an uplink location, and the first location is a location for periodically sending the first type of signal; and sending, by the network device, the first type of data at a second location in the time domain resource, where the second location is located between the first location and a next location for periodically sending the first type of signal.

With reference to any one of the second aspect or the foregoing implementations of the second aspect, in a fifth possible implementation of the second aspect, before the sending, by the network device, the downlink signal, the method further includes: sending, by the network device, the second type of signal; and starting, by the network device, to send the first type of signal after a preset third time domain resource length.

With reference to any one of the second aspect or the first to the fourth possible implementations of the second aspect, in a sixth possible implementation of the second aspect, before the sending, by the network device, the downlink signal, the method further includes: sending, by the network device, second indication information, where the second indication information indicates the terminal device to start to monitor the first type of signal.

According to a third aspect, a signal monitoring method is provided, including: receiving, by a terminal device, first indication information, where the first indication information indicates that a first location in a time domain resource is an uplink location, the first location is a predetermined location for monitoring a first type of signal, and the first type of signal is a signal used to indicate power consumption reduction information; and monitoring, by the terminal device, the first type of data at at least one second location in the time domain resource, where the at least one second location is located after the first location.

With reference to the third aspect, in a first possible implementation of the third aspect, the first location is a location for periodically monitoring the first type of signal, and the at least one second location is located between the first location and a next location for periodically monitoring the first type of signal.

With reference to the third aspect, in a second possible implementation of the third aspect, the method further includes: detecting, by the terminal device, a first signal, where the first signal is the first type of signal; and determining, by the terminal device based on the first signal, that a location of a next to-be-monitored first type of signal is the first location.

According to a fourth aspect, a signal sending method is provided, including: sending, by a network device, first indication information, where the first indication information indicates that a first location in a time domain resource is an uplink location, the first location is a predetermined location of a first type of signal to be monitored by a terminal device, and the first type of signal is a signal used to indicate power consumption reduction information; and sending, by the network device, the first type of signal at a second location in the time domain resource, where the second location is located after the first location.

With reference to the fourth aspect, in a first possible implementation of the fourth aspect, the first location is a location for periodically sending the first type of signal, and the at least one second location is located between the first location and a next location for periodically sending the first type of signal.

With reference to the fourth aspect, in a second possible implementation of the fourth aspect, the method further includes: the downlink signal includes a first signal, the first signal is the first type of signal, and the first signal is used to determine that a location, in the time domain resource, of a next signal to be monitored by the terminal device is the first location.

According to a fifth aspect, a signal monitoring method is provided, including: receiving, by a terminal device, first indication information, where the first indication information indicates that a first location in a time domain resource is an uplink location, the first location is a location for periodically monitoring a first type of signal, and the first type of signal is a signal used to indicate power consumption reduction information; and determining, by the terminal device, not to monitor the first type of signal at a location between the first location and a next location for periodically monitoring the first type of signal.

According to a sixth aspect, a signal sending method is provided, including: sending, by a network device, first indication information, where the first indication information indicates that a first location in a time domain resource is an uplink location, the first location is a location for periodically sending a first type of signal, and the first type of signal is a signal used to indicate power consumption reduction information; and determining, by the network device, not to send the first type of signal at a location between the first location and a next location for periodically sending the first type of signal.

According to a seventh aspect, a signal monitoring method is provided, including: monitoring, by a terminal device, a first type of signal in a downlink signal, where the first type of signal is a signal used to indicate power consumption reduction information; determining, by the terminal device, that the first type of signal is not detected at a first location in a time domain resource, where the first location is a predetermined location for monitoring the first type of signal; and starting, by the terminal device, to monitor a second type of signal from a third location in the time domain resource, where the second type of signal is a signal used to indicate data scheduling, and the third location is located after the first location.

With reference to the seventh aspect, in a first possible implementation of the seventh aspect, the first location is a location for periodically monitoring the first type of signal.

With reference to the seventh aspect, in a first possible implementation of the seventh aspect, the monitoring, by a terminal device, a first type of signal in a downlink signal includes: detecting, by the terminal device, a first signal in the downlink signal, where the first signal is the first type of signal; and the method further includes: determining, by the terminal device based on the first signal, that a location of a next to-be-monitored first type of signal is the first location.

According to an eighth aspect, a signal monitoring method is provided, including: determining, by a terminal device, whether a second type of signal is detected in a preset third time domain resource length, where the second type of signal is a signal used to indicate data scheduling; and starting, by the terminal device, to monitor a first type of signal when the second type of signal is not detected in the preset third time domain resource length, where the first type of signal is a signal used to indicate power consumption reduction information.

With reference to the eighth aspect, in a first possible implementation of the eighth aspect, the terminal device does not monitor the first type of signal when monitoring the second type of signal.

According to a ninth aspect, a signal sending method is provided, including: sending, by a network device, a second type of signal, where the second type of signal is a signal used to indicate data scheduling; and starting, by the network device, to send a first type of signal after a preset third time domain resource length, where the first type of signal is a signal used to indicate power consumption reduction information.

With reference to the ninth aspect, in a first possible implementation of the ninth aspect, the network device sends only one of the first type of signal and the second type of signal in a same time interval.

According to a tenth aspect, a signal monitoring method is provided, including: receiving, by a terminal device, second indication information from a network device, where the second indication information indicates the terminal device to start to monitor a first type of signal, and the first type of signal is a signal used to indicate power consumption reduction information; and starting, by the terminal device, to monitor the first type of signal after receiving the second indication information, where the terminal device does not monitor a second type of signal when monitoring the first type of signal, and the second type of signal is a signal used to indicate data scheduling.

With reference to the tenth aspect, in a first possible implementation of the tenth aspect, the second indication information is carried in any one of the following: RRC signaling, a MAC CE, and DCI.

According to an eleventh aspect, a signal sending method is provided, including: sending, by a network device, second indication information, where the second indication information indicates a terminal device to start to monitor a first type of signal, and the first type of signal is a signal used to indicate power consumption reduction information; and starting, by the network device, to send the first type of signal after sending the second indication information, where the network device sends only one of the first type of signal and the second type of signal in a same time interval.

With reference to the eleventh aspect, in a first possible implementation of the eleventh aspect, the second indication information is carried in any one of the following: RRC signaling, a MAC CE, and DCI.

According to a twelfth aspect, a signal monitoring method is provided, including: detecting, by a terminal device, a second signal in a downlink signal, where the second signal is a first type of signal, and the first type of signal is a signal used to indicate power consumption reduction information; and determining, by the terminal device based on the second signal and a mapping relationship between the first type of signal and a meaning of power consumption reduction information, a meaning of power consumption reduction information that is indicated by the second signal.

With reference to the twelfth aspect, in a first possible implementation of the twelfth aspect, the mapping relationship is predefined.

With reference to the twelfth aspect, in a second possible implementation of the twelfth aspect, the method further includes: receiving, by the terminal device, third indication information, where the third indication information is used to indicate the mapping relationship.

With reference to any one of the twelfth aspect or the foregoing possible implementations of the twelfth aspect, in a third possible implementation of the twelfth aspect, the third indication information is carried in RRC signaling.

With reference to any one of the twelfth aspect or the foregoing possible implementations of the twelfth aspect, the first type of signal is any one of the following: downlink control information DCI, a sequence, and a reference signal.

With reference to any one of the twelfth aspect or the foregoing possible implementations of the twelfth aspect, the meaning of the power consumption reduction information includes at least one of the following: data scheduling is not performed in a first time domain resource length; and data scheduling can be performed after a second time domain resource length.

With reference to any one of the twelfth aspect or the foregoing possible implementations of the twelfth aspect, the first time domain resource length or the second time domain resource length is any one of the following: one or more slots, one or more subframes, one or more milliseconds, and one or more DRX cycles.

According to a thirteenth aspect, a signal sending method is provided, including: sending, by a network device, third indication information, where the third indication information is used to indicate a mapping relationship between a first type of signal and a meaning of power consumption reduction information, and the first type of signal is a signal used to indicate power consumption reduction information; and sending, by the network device, a second signal, where the second signal is the first type of signal.

With reference to the thirteenth aspect, in a first possible implementation of the thirteenth aspect, the third indication information is carried in RRC signaling.

With reference to the thirteenth aspect or the first possible implementation of the thirteenth aspect, in a second possible implementation of the thirteenth aspect, the first type of signal is any one of the following: DCI, a sequence, and a reference signal.

With reference to any one of the thirteenth aspect or the foregoing possible implementations of the thirteenth aspect, in a third possible implementation of the thirteenth aspect, the meaning of the power consumption reduction information includes at least one of the following: data scheduling is not performed in a first time domain resource length; and data scheduling can be performed after a second time domain resource length.

With reference to any one of the thirteenth aspect or the foregoing possible implementations of the thirteenth aspect, in a fourth possible implementation of the thirteenth aspect, the first time domain resource length or the second time domain resource length is any one of the following: one or more slots, one or more subframes, one or more milliseconds, and one or more DRX cycles.

According to a fourteenth aspect, a terminal device is provided, including: a communications interface; a memory, configured to store an instruction; and a processor, separately connected to the memory and the communications interface, and configured to execute the instruction stored in the memory, to perform the following steps when the instruction is executed: receiving a downlink signal by using the communications interface; and monitoring a first type of signal in the downlink signal, where the first type of signal is a signal used to indicate power consumption reduction information, the terminal device does not monitor a second type of signal when monitoring the first type of signal, and the second type of signal is a signal used to indicate data scheduling.

With reference to the fourteenth aspect, in a first implementation of the fourteenth aspect, the processor is specifically configured to detect a first signal, where the first signal is the first type of signal; and the processor is further configured to determine a location of a next to-be-monitored signal in a time domain resource based on the first signal, where the next to-be-monitored signal is the first type of signal or the second type of signal.

With reference to the first implementation of the fourteenth aspect, in a second implementation of the fourteenth aspect, the first signal indicates that data scheduling is not performed in a first time domain resource length, and the processor is specifically configured to start to monitor the first type of signal from a location after the first time domain resource length in the time domain resource.

With reference to the first implementation of the fourteenth aspect, in a third implementation of the fourteenth aspect, the first signal indicates that data scheduling can be performed after a second time domain resource length, and the processor is specifically configured to start to monitor the second type of signal from a location after the second time domain resource length in the time domain resource.

With reference to the first implementation of the fourteenth aspect, in a fourth implementation of the fourteenth aspect, the processor is further configured to: receive first indication information by using the communications interface, where the first indication information indicates that a first location in the time domain resource is an uplink location, the first location is the location of the next to-be-monitored signal that is determined based on the first signal, and the next to-be-monitored signal is the first type of signal; and monitor the first type of data at at least one second location in the time domain resource, where the at least one second location is located after the first location.

With reference to the first implementation of the fourteenth aspect, in a fifth implementation of the fourteenth aspect, the processor is specifically configured to determine that the first type of signal is not detected at a first location in the time domain resource, where the first location is the location of the next to-be-monitored signal that is determined based on the first signal, and the next to-be-monitored signal is the first type of signal; and the processor is further configured to start to monitor the second type of signal from a third location in the time domain resource, where the third location is located after the first location.

With reference to the fourteenth aspect, in a sixth implementation of the fourteenth aspect, the processor is specifically configured to periodically monitor the first type of signal.

With reference to the sixth implementation of the fourteenth aspect, in a seventh implementation of the fourteenth aspect, the processor is further configured to: receive first indication information, where the first indication information indicates that a first location in a time domain resource is an uplink location, and the first location is a location for periodically monitoring the first type of signal; and determine not to monitor the first type of signal at a location between the first location and a next location for periodically monitoring the first type of signal.

With reference to the sixth implementation of the fourteenth aspect, in an eighth implementation of the fourteenth aspect, the processor is further configured to: receive first indication information, where the first indication information indicates that a first location in a time domain resource is an uplink location; and monitor the first type of data at at least one second location in the time domain resource, where the first location is a location for periodically monitoring the first type of signal, and the at least one second location is located after the first location.

With reference to the sixth implementation of the fourteenth aspect, in a ninth implementation of the fourteenth aspect, the processor is specifically configured to determine that the first type of signal is not detected at a first location in a time domain resource, where the first location is a location for periodically monitoring the first type of signal; and the processor is further configured to start to monitor the second type of signal from a third location in the time domain resource, where the third location is located after the first location.

With reference to any one of the fourteenth aspect or the foregoing implementations of the fourteenth aspect, in a tenth implementation of the fourteenth aspect, before monitoring the first type of signal in the downlink signal, the processor is further configured to: determine whether the second type of signal is detected in a preset third time domain resource length; and start to monitor the first type of signal when the second type of signal is not detected in the preset third time domain resource length.

With reference to any one of the fourteenth aspect or the foregoing implementations of the fourteenth aspect, in an eleventh implementation of the fourteenth aspect, before the terminal device monitors the first type of signal in the downlink signal, the processor is further configured to: receive second indication information by using the communications interface, where the second indication information indicates the terminal device to start to monitor the first type of signal; and start to monitor the first type of signal after receiving the second indication information.

With reference to the eleventh implementation of the fourteenth aspect, in a twelfth implementation of the fourteenth aspect, the second indication information is carried in any one of the following: RRC signaling, a MAC CE, and DCI.

With reference to any one of the fourteenth aspect or the foregoing implementations of the fourteenth aspect, in a thirteenth implementation of the fourteenth aspect, the first type of signal is used to indicate any one of the following: data scheduling is not performed in a first time domain resource length; and data scheduling can be performed after a second time domain resource length.

With reference to any one of the fourteenth aspect or the foregoing implementations of the fourteenth aspect, in a fourteenth implementation of the fourteenth aspect, the first type of signal is any one of the following: DCI, a sequence, and a reference signal; or the second type of signal is DCI.

According to a fifteenth aspect, a network device is provided, including: a communications interface; a memory, configured to store an instruction; and a processor, separately connected to the memory and the communications interface, and configured to execute the instruction stored in the memory, to perform the following steps when the instruction is executed: generating a downlink signal, where the downlink signal includes a first type of signal or a second type of signal that is to be monitored by a terminal device, the network device sends only one of the first type of signal and the second type of signal in a same time interval, the first type of signal is a signal used to indicate power consumption reduction information, and the second type of signal is a signal used to indicate data scheduling; and sending the downlink signal.

With reference to the fifteenth aspect, in a first possible implementation of the fifteenth aspect, the downlink signal includes a first signal, the first signal is the first type of signal, the first signal is used to determine a location, in a time domain resource, of a next signal to be monitored by the terminal device, and the next signal to be monitored by the terminal device is the first type of signal or the second type of signal.

With reference to the first possible implementation of the fifteenth aspect, in a second possible implementation of the fifteenth aspect, the processor is further configured to: send first indication information by using the communications interface, where the first indication information indicates that a first location in the time domain resource is an uplink location, the first location is the location that is of the next signal to be monitored by the terminal device and that is determined based on the first signal, and the next signal to be monitored by the terminal device is the first type of signal; and send the first type of signal at a second location in the time domain resource, where the second location is located after the first location.

With reference to the fifteenth aspect, in a third possible implementation of the fifteenth aspect, the processor is specifically configured to periodically send the first type of signal by using the communications interface.

With reference to the third possible implementation of the fifteenth aspect, in a fourth possible implementation of the fifteenth aspect, the processor is further configured to: send first indication information by using the communications interface, where the first indication information indicates that a first location in the time domain resource is an uplink location, and the first location is a location for periodically sending the first type of signal; and send the first type of data at a second location in the time domain resource by using the communications interface, where the second location is located between the first location and a next location for periodically sending the first type of signal.

With reference to any one of the fifteenth aspect or the foregoing implementations of the fifteenth aspect, in a fifth possible implementation of the fifteenth aspect, before the network device sends the downlink signal, the processor is further configured to: send the second type of signal by using the communications interface; and start to send the first type of signal after a preset third time domain resource length by using the communications interface.

With reference to any one of the fifteenth aspect or the first to the fourth possible implementations of the fifteenth aspect, in a sixth possible implementation of the fifteenth aspect, before the network device sends the downlink signal, the processor is further configured to send second indication information by using the communications interface, where the second indication information indicates the terminal device to start to monitor the first type of signal.

According to a sixteenth aspect, a terminal device is provided, including: a communications interface; a memory, configured to store an instruction; and a processor, separately connected to the memory and the communications interface, and configured to execute the instruction stored in the memory, to perform the following steps when the instruction is executed: receiving first indication information by using the communications interface, where the first indication information indicates that a first location in a time domain resource is an uplink location, the first location is a predetermined location for monitoring a first type of signal, and the first type of signal is a signal used to indicate power consumption reduction information; and monitoring the first type of data at at least one second location in the time domain resource, where the at least one second location is located after the first location.

With reference to the sixteenth aspect, in a first possible implementation of the sixteenth aspect, the first location is a location for periodically monitoring the first type of signal, and the at least one second location is located between the first location and a next location for periodically monitoring the first type of signal.

With reference to the sixteenth aspect, in a second possible implementation of the sixteenth aspect, the processor is further configured to: detect a first signal, where the first signal is the first type of signal; and determine, based on the first signal, that a location of a next to-be-monitored first type of signal is the first location.

According to a seventeenth aspect, a network device is provided, including: a communications interface; a memory, configured to store an instruction; and a processor, separately connected to the memory and the communications interface, and configured to execute the instruction stored in the memory, to perform the following steps when the instruction is executed: sending first indication information by using the communications interface, where the first indication information indicates that a first location in a time domain resource is an uplink location, the first location is a predetermined location of a first type of signal to be monitored by a terminal device, and the first type of signal is a signal used to indicate power consumption reduction information; and sending the first type of signal at a second location in the time domain resource by using the communications interface, where the second location is located after the first location.

With reference to the seventeenth aspect, in a first possible implementation of the seventeenth aspect, the first location is a location for periodically sending the first type of signal, and the at least one second location is located between the first location and a next location for periodically sending the first type of signal.

With reference to the seventeenth aspect, in a second possible implementation of the seventeenth aspect, the downlink signal includes a first signal, the first signal is the first type of signal, and the first signal is used to determine that a location, in the time domain resource, of a next signal to be monitored by the terminal device is the first location.

According to an eighteenth aspect, a terminal device is provided, including: a communications interface; a memory, configured to store an instruction; and a processor, separately connected to the memory and the communications interface, and configured to execute the instruction stored in the memory, to perform the following steps when the instruction is executed: receiving first indication information by using the communications interface, where the first indication information indicates that a first location in a time domain resource is an uplink location, the first location is a location for periodically monitoring a first type of signal, and the first type of signal is a signal used to indicate power consumption reduction information; and determining not to monitor the first type of signal at a location between the first location and a next location for periodically monitoring the first type of signal.

According to a nineteenth aspect, a network device is provided, including: a communications interface; a memory, configured to store an instruction; and a processor, separately connected to the memory and the communications interface, and configured to execute the instruction stored in the memory, to perform the following steps when the instruction is executed: sending first indication information by using the communications interface, where the first indication information indicates that a first location in a time domain resource is an uplink location, the first location is a location for periodically sending a first type of signal, and the first type of signal is a signal used to indicate power consumption reduction information; and determining not to send the first type of signal at a location between the first location and a next location for periodically sending the first type of signal.

According to a twentieth aspect, a terminal device is provided, including: a communications interface; a memory, configured to store an instruction; and a processor, separately connected to the memory and the communications interface, and configured to execute the instruction stored in the memory, to perform the following steps when the instruction is executed: monitoring a first type of signal in a downlink signal, where the first type of signal is a signal used to indicate power consumption reduction information; determining that the first type of signal is not detected at a first location in a time domain resource, where the first location is a predetermined location for monitoring the first type of signal; and starting to monitor a second type of signal from a third location in the time domain resource, where the second type of signal is a signal used to indicate data scheduling, and the third location is located after the first location.

With reference to the twentieth aspect, in a first possible implementation of the twentieth aspect, the first location is a location for periodically monitoring the first type of signal.

With reference to the twentieth aspect, in a first possible implementation of the twentieth aspect, the processor is specifically configured to detect a first signal in the downlink signal, where the first signal is the first type of signal; and the processor is further configured to determine, based on the first signal, that a location of a next to-be-monitored first type of signal is the first location.

According to a twenty-first aspect, a terminal device is provided, including: a communications interface; a memory, configured to store an instruction; and a processor, separately connected to the memory and the communications interface, and configured to execute the instruction stored in the memory, to perform the following steps when the instruction is executed: determining whether a second type of signal is detected in a preset third time domain resource length, where the second type of signal is a signal used to indicate data scheduling; and starting to monitor a first type of signal when the second type of signal is not detected in the preset third time domain resource length, where the first type of signal is a signal used to indicate power consumption reduction information.

With reference to the twenty-first aspect, in a first possible implementation of the twenty-first aspect, the processor does not monitor the first type of signal when monitoring the second type of signal.

According to a twenty-second aspect, a network device is provided, including: a communications interface; a memory, configured to store an instruction; and a processor, separately connected to the memory and the communications interface, and configured to execute the instruction stored in the memory, to perform the following steps when the instruction is executed: sending a second type of signal by using the communications interface, where the second type of signal is a signal used to indicate data scheduling; and starting to send a first type of signal after a preset third time domain resource length by using the communications interface, where the first type of signal is a signal used to indicate power consumption reduction information.

With reference to the twenty-second aspect, in a first possible implementation of the twenty-second aspect, the processor sends only one of the first type of signal and the second type of signal in a same time interval by using the communications interface.

According to a twenty-third aspect, a terminal device is provided, including: a communications interface; a memory, configured to store an instruction; and a processor, separately connected to the memory and the communications interface, and configured to execute the instruction stored in the memory, to perform the following steps when the instruction is executed: receiving second indication information from a network device by using the communications interface, where the second indication information indicates the terminal device to start to monitor a first type of signal, and the first type of signal is a signal used to indicate power consumption reduction information; and starting to monitor the first type of signal after receiving the second indication information, where the terminal device does not monitor a second type of signal when monitoring the first type of signal, and the second type of signal is a signal used to indicate data scheduling.

With reference to the twenty-third aspect, in a first possible implementation of the twenty-third aspect, the second indication information is carried in any one of the following: RRC signaling, a MAC CE, and DCI.

According to a twenty-fourth aspect, a network device is provided, including: a communications interface; a memory, configured to store an instruction; and a processor, separately connected to the memory and the communications interface, and configured to execute the instruction stored in the memory, to perform the following steps when the instruction is executed: sending second indication information by using the communications interface, where the second indication information indicates a terminal device to start to monitor a first type of signal, and the first type of signal is a signal used to indicate power consumption reduction information; and starting to send the first type of signal after sending the second indication information by using the communications interface, where the processor sends only one of the first type of signal and the second type of signal in a same time interval by using the communications interface.

With reference to the twenty-fourth aspect, in a first possible implementation of the twenty-fourth aspect, the second indication information is carried in any one of the following: RRC signaling, a MAC CE, and DCI.

According to a twenty-fifth aspect, a terminal device is provided, including: a communications interface; a memory, configured to store an instruction; and a processor, separately connected to the memory and the communications interface, and configured to execute the instruction stored in the memory, to perform the following steps when the instruction is executed: detecting a second signal in a downlink signal, where the second signal is a first type of signal, and the first type of signal is a signal used to indicate power consumption reduction information; and determining, based on the second signal and a mapping relationship between the first type of signal and a meaning of power consumption reduction information, a meaning of power consumption reduction information that is indicated by the second signal.

With reference to the twelfth aspect, in a first possible implementation of the twenty-fifth aspect, the mapping relationship is predefined.

With reference to the twenty-fifth aspect, in a second possible implementation of the twenty-fifth aspect, the processor is further configured to receive third indication information, where the third indication information is used to indicate the mapping relationship.

With reference to any one of the twenty-fifth aspect or the foregoing possible implementations of the twenty-fifth aspect, in a third possible implementation of the twenty-fifth aspect, the third indication information is carried in RRC signaling.

With reference to any one of the twenty-fifth aspect or the foregoing possible implementations of the twenty-fifth aspect, the first type of signal is any one of the following: DCI, a sequence, and a reference signal.

With reference to any one of the twenty-fifth aspect or the foregoing possible implementations of the twenty-fifth aspect, the meaning of the power consumption reduction information includes at least one of the following: data scheduling is not performed in a first time domain resource length; and data scheduling can be performed after a second time domain resource length.

With reference to any one of the twenty-fifth aspect or the foregoing possible implementations of the twenty-fifth aspect, the first time domain resource length or the second time domain resource length is any one of the following: one or more slots, one or more subframes, one or more milliseconds, and one or more DRX cycles.

According to a twenty-sixth aspect, a network device is provided, including: a communications interface; a memory, configured to store an instruction; and a processor, separately connected to the memory and the communications interface, and configured to execute the instruction stored in the memory, to perform the following steps when the instruction is executed: sending third indication information by using the communications interface, where the third indication information is used to indicate a mapping relationship between a first type of signal and a meaning of power consumption reduction information, and the first type of signal is a signal used to indicate power consumption reduction information; and sending a second signal by using the communications interface, where the second signal is the first type of signal.

With reference to the twenty-sixth aspect, in a first possible implementation of the twenty-sixth aspect, the third indication information is carried in RRC signaling.

With reference to the twenty-sixth aspect or the first possible implementation of the twenty-sixth aspect, in a second possible implementation of the twenty-sixth aspect, the first type of signal is any one of the following: DCI, a sequence, and a reference signal.

With reference to any one of the twenty-sixth aspect or the foregoing possible implementations of the twenty-sixth aspect, in a third possible implementation of the twenty-sixth aspect, the meaning of the power consumption reduction information includes at least one of the following: data scheduling is not performed in a first time domain resource length; and data scheduling can be performed after a second time domain resource length.

With reference to any one of the twenty-sixth aspect or the foregoing possible implementations of the twenty-sixth aspect, in a fourth possible implementation of the twenty-sixth aspect, the first time domain resource length or the second time domain resource length is any one of the following: one or more slots, one or more subframes, one or more milliseconds, and one or more DRX cycles.

According to a twenty-seventh aspect, a terminal device is provided, including: a receiving unit, configured to receive a downlink signal; and a monitoring unit, configured to monitor a first type of signal in the downlink signal, where the first type of signal is a signal used to indicate power consumption reduction information, the terminal device does not monitor a second type of signal when monitoring the first type of signal, and the second type of signal is a signal used to indicate data scheduling.

With reference to the twenty-seventh aspect, in a first implementation of the twenty-seventh aspect, the monitoring unit is specifically configured to detect a first signal, where the first signal is the first type of signal; and the monitoring unit is further configured to determine a location of a next to-be-monitored signal in a time domain resource based on the first signal, where the next to-be-monitored signal is the first type of signal or the second type of signal.

With reference to the first implementation of the twenty-seventh aspect, in a second implementation of the twenty-seventh aspect, the first signal indicates that data scheduling is not performed in a first time domain resource length, and the monitoring unit is specifically configured to start to monitor the first type of signal from a location after the first time domain resource length in the time domain resource.

With reference to the first implementation of the twenty-seventh aspect, in a third implementation of the twenty-seventh aspect, the first signal indicates that data scheduling can be performed after a second time domain resource length, and the monitoring unit is specifically configured to start to monitor the second type of signal from a location after the second time domain resource length in the time domain resource.

With reference to the first implementation of the twenty-seventh aspect, in a fourth implementation of the twenty-seventh aspect, the receiving unit is further configured to receive first indication information, where the first indication information indicates that a first location in the time domain resource is an uplink location, the first location is the location of the next to-be-monitored signal that is determined based on the first signal, and the next to-be-monitored signal is the first type of signal; and the monitoring unit is further configured to monitor the first type of data at at least one second location in the time domain resource, where the at least one second location is located after the first location.

With reference to the first implementation of the twenty-seventh aspect, in a fifth implementation of the twenty-seventh aspect, the monitoring unit is specifically configured to determine that the first type of signal is not detected at a first location in the time domain resource, where the first location is the location of the next to-be-monitored signal that is determined based on the first signal, and the next to-be-monitored signal is the first type of signal; and the monitoring unit is further configured to start to monitor the second type of signal from a third location in the time domain resource, where the third location is located after the first location.

With reference to the twenty-seventh aspect, in a sixth implementation of the twenty-seventh aspect, the monitoring unit is specifically configured to periodically monitor the first type of signal.

With reference to the sixth implementation of the twenty-seventh aspect, in a seventh implementation of the twenty-seventh aspect, the receiving unit is further configured to receive first indication information, where the first indication information indicates that a first location in a time domain resource is an uplink location, and the first location is a location for periodically monitoring the first type of signal; and the monitoring unit determines not to monitor the first type of signal at a location between the first location and a next location for periodically monitoring the first type of signal.

With reference to the sixth implementation of the twenty-seventh aspect, in an eighth implementation of the twenty-seventh aspect, the receiving unit is further configured to receive first indication information, where the first indication information indicates that a first location in a time domain resource is an uplink location; and the monitoring unit is further configured to monitor the first type of data at at least one second location in the time domain resource, where the first location is a location for periodically monitoring the first type of signal, and the at least one second location is located after the first location.

With reference to the sixth implementation of the twenty-seventh aspect, in a ninth implementation of the twenty-seventh aspect, the monitoring unit is specifically configured to determine that the first type of signal is not detected at a first location in a time domain resource, where the first location is a location for periodically monitoring the first type of signal; and the monitoring unit is further configured to start to monitor the second type of signal from a third location in the time domain resource, where the third location is located after the first location.

With reference to any one of the twenty-seventh aspect or the foregoing implementations of the twenty-seventh aspect, in a tenth implementation of the twenty-seventh aspect, before the terminal device monitors the first type of signal in the downlink signal, the monitoring unit is further configured to determine whether the second type of signal is detected in a preset third time domain resource length; and the monitoring unit starts to monitor the first type of signal when the second type of signal is not detected in the preset third time domain resource length.

With reference to any one of the twenty-seventh aspect or the foregoing implementations of the twenty-seventh aspect, in an eleventh implementation of the twenty-seventh aspect, before the terminal device monitors the first type of signal in the downlink signal, the receiving unit is further configured to receive second indication information, where the second indication information indicates the terminal device to start to monitor the first type of signal; and the monitoring unit is further configured to start to monitor the first type of signal after the second indication information is received.

With reference to the eleventh implementation of the twenty-seventh aspect, in a twelfth implementation of the twenty-seventh aspect, the second indication information is carried in any one of the following: RRC signaling, a MAC CE, and DCI.

With reference to any one of the twenty-seventh aspect or the foregoing implementations of the twenty-seventh aspect, in a thirteenth implementation of the twenty-seventh aspect, the first type of signal is used to indicate any one of the following: data scheduling is not performed in a first time domain resource length; and data scheduling can be performed after a second time domain resource length.

With reference to any one of the twenty-seventh aspect or the foregoing implementations of the twenty-seventh aspect, in a fourteenth implementation of the twenty-seventh aspect, the first type of signal is any one of the following: DCI, a sequence, and a reference signal; or the second type of signal is DCI.

According to a twenty-eighth aspect, a signal sending method is provided, including: a generation unit, configured to generate a downlink signal, where the downlink signal includes a first type of signal or a second type of signal that is to be monitored by a terminal device, the first type of signal is a signal used to indicate power consumption reduction information, and the second type of signal is a signal used to indicate data scheduling; and a sending unit, configured to send the downlink signal, where the sending unit sends only one of the first type of signal and the second type of signal in a same time interval.

With reference to the twenty-eighth aspect, in a first possible implementation of the twenty-eighth aspect, the downlink signal includes a first signal, the first signal is the first type of signal, the first signal is used to determine a location, in a time domain resource, of a next signal to be monitored by the terminal device, and the next signal to be monitored by the terminal device is the first type of signal or the second type of signal.

With reference to the first possible implementation of the twenty-eighth aspect, in a second possible implementation of the twenty-eighth aspect, the sending unit is further configured to: send first indication information, where the first indication information indicates that a first location in the time domain resource is an uplink location, the first location is the location that is of the next signal to be monitored by the terminal device and that is determined based on the first signal, and the next signal to be monitored by the terminal device is the first type of signal; and send the first type of signal at a second location in the time domain resource, where the second location is located after the first location.

With reference to the twenty-eighth aspect, in a third possible implementation of the twenty-eighth aspect, the sending unit is specifically configured to periodically send the first type of signal.

With reference to the third possible implementation of the twenty-eighth aspect, in a fourth possible implementation of the twenty-eighth aspect, the sending unit is further configured to: send first indication information, where the first indication information indicates that a first location in the time domain resource is an uplink location, and the first location is a location for periodically sending the first type of signal; and send the first type of data at a second location in the time domain resource, where the second location is located between the first location and a next location for periodically sending the first type of signal.

With reference to any one of the twenty-eighth aspect or the foregoing implementations of the twenty-eighth aspect, in a fifth possible implementation of the twenty-eighth aspect, before sending the downlink signal, the sending unit is further configured to: send the second type of signal; and start to send the first type of signal after a preset third time domain resource length.

With reference to any one of the twenty-eighth aspect or the first to the fourth possible implementations of the twenty-eighth aspect, in a sixth possible implementation of the twenty-eighth aspect, before sending the downlink signal, the sending unit is further configured to send second indication information, where the second indication information indicates the terminal device to start to monitor the first type of signal.

According to a twenty-ninth aspect, a terminal device is provided, including: a receiving unit, configured to receive first indication information, where the first indication information indicates that a first location in a time domain resource is an uplink location, the first location is a predetermined location for monitoring a first type of signal, and the first type of signal is a signal used to indicate power consumption reduction information; and a monitoring unit, configured to monitor the first type of data at at least one second location in the time domain resource, where the at least one second location is located after the first location.

With reference to the twenty-ninth aspect, in a first possible implementation of the twenty-ninth aspect, the first location is a location for periodically monitoring the first type of signal, and the at least one second location is located between the first location and a next location for periodically monitoring the first type of signal.

With reference to the twenty-ninth aspect, in a second possible implementation of the twenty-ninth aspect, the monitoring unit is further configured to: detect a first signal, where the first signal is the first type of signal; and determine, based on the first signal, that a location of a next to-be-monitored first type of signal is the first location.

According to a thirtieth aspect, a network device is provided, including: a first sending unit, configured to send first indication information, where the first indication information indicates that a first location in a time domain resource is an uplink location, the first location is a predetermined location of a first type of signal to be monitored by a terminal device, and the first type of signal is a signal used to indicate power consumption reduction information; and a second sending unit, configured to send the first type of signal at a second location in the time domain resource, where the second location is located after the first location.

With reference to the thirtieth aspect, in a first possible implementation of the thirtieth aspect, the first location is a location for periodically sending the first type of signal, and the at least one second location is located between the first location and a next location for periodically sending the first type of signal.

With reference to the thirtieth aspect, in a second possible implementation of the thirtieth aspect, the downlink signal includes a first signal, the first signal is the first type of signal, and the first signal is used to determine that a location, in the time domain resource, of a next signal to be monitored by the terminal device is the first location.

According to a thirty-first aspect, a terminal device is provided, including: a receiving unit, configured to receive first indication information, where the first indication information indicates that a first location in a time domain resource is an uplink location, the first location is a location for periodically monitoring a first type of signal, and the first type of signal is a signal used to indicate power consumption reduction information; and a monitoring unit, configured to determine not to monitor the first type of signal at a location between the first location and a next location for periodically monitoring the first type of signal.

According to a thirty-second aspect, a network device is provided, including: a sending unit, configured to send first indication information, where the first indication information indicates that a first location in a time domain resource is an uplink location, the first location is a location for periodically sending a first type of signal, and the first type of signal is a signal used to indicate power consumption reduction information; and a processing unit, configured to determine not to send the first type of signal at a location between the first location and a next location for periodically sending the first type of signal.

According to a thirty-third aspect, a terminal device is provided, including: a monitoring unit, configured to monitor a first type of signal in a downlink signal, where the first type of signal is a signal used to indicate power consumption reduction information; and a processing unit, configured to determine that the first type of signal is not detected at a first location in a time domain resource, where the first location is a predetermined location for monitoring the first type of signal; where the monitoring unit starts to monitor a second type of signal from a third location in the time domain resource, where the second type of signal is a signal used to indicate data scheduling, and the third location is located after the first location.

With reference to the thirty-third aspect, in a first possible implementation of the thirty-third aspect, the first location is a location for periodically monitoring the first type of signal.

With reference to the thirty-third aspect, in a first possible implementation of the thirty-third aspect, the monitoring unit is specifically configured to detect a first signal in the downlink signal, where the first signal is the first type of signal; and the processing unit is further configured to determine, based on the first signal, that a location of a next to-be-monitored first type of signal is the first location.

According to a thirty-fourth aspect, a terminal device is provided, including: a processing unit, configured to determine whether a second type of signal is detected in a preset third time domain resource length, where the second type of signal is a signal used to indicate data scheduling; and a monitoring unit, configured to start to monitor a first type of signal when the second type of signal is not detected in the preset third time domain resource length, where the first type of signal is a signal used to indicate power consumption reduction information.

With reference to the thirty-fourth aspect, in a first possible implementation of the thirty-fourth aspect, the monitoring unit does not monitor the first type of signal when monitoring the second type of signal.

According to a thirty-fifth aspect, a network device is provided, including: a first sending unit, configured to send a second type of signal, where the second type of signal is a signal used to indicate data scheduling; and a second sending unit, configured to start to send a first type of signal after a preset third time domain resource length, where the first type of signal is a signal used to indicate power consumption reduction information.

With reference to the thirty-fifth aspect, in a first possible implementation of the thirty-fifth aspect, the network device sends only one of the first type of signal and the second type of signal in a same time interval.

According to a thirty-sixth aspect, a terminal device is provided, including: a receiving unit, configured to receive second indication information from a network device, where the second indication information indicates the terminal device to start to monitor a first type of signal, and the first type of signal is a signal used to indicate power consumption reduction information; and a monitoring unit, configured to start to monitor the first type of signal after the second indication information is received, where the monitoring unit does not monitor a second type of signal when monitoring the first type of signal, and the second type of signal is a signal used to indicate data scheduling.

With reference to the thirty-sixth aspect, in a first possible implementation of the thirty-sixth aspect, the second indication information is carried in any one of the following: RRC signaling, a MAC CE, and DCI.

According to a thirty-seventh aspect, a network device is provided, including: a first sending unit, configured to send second indication information, where the second indication information indicates a terminal device to start to monitor a first type of signal, and the first type of signal is a signal used to indicate power consumption reduction information; and a second sending unit, configured to start to send the first type of signal after the second indication information is sent, where the second sending unit sends only one of the first type of signal and the second type of signal in a same time interval.

With reference to the thirty-seventh aspect, in a first possible implementation of the thirty-seventh aspect, the second indication information is carried in any one of the following: RRC signaling, a MAC CE, and DCI.

According to a thirty-eighth aspect, a terminal device is provided, including: a monitoring unit, configured to detect a second signal in a downlink signal, where the second signal is a first type of signal, and the first type of signal is a signal used to indicate power consumption reduction information; and a processing unit, configured to determine, based on the second signal and a mapping relationship between the first type of signal and a meaning of the power consumption reduction information, a meaning of power consumption reduction information indicated by the second signal.

With reference to the twelfth aspect, in a first possible implementation of the thirty-eighth aspect, the mapping relationship is predefined.

With reference to the thirty-eighth aspect, in a second possible implementation of the thirty-eighth aspect, the terminal device further includes a receiving unit, configured to receive third indication information, where the third indication information is used to indicate the mapping relationship.

With reference to any one of the thirty-eighth aspect or the foregoing possible implementations of the thirty-eighth aspect, in a third possible implementation of the thirty-eighth aspect, the third indication information is carried in RRC signaling.

With reference to any one of the thirty-eighth aspect or the foregoing possible implementations of the thirty-eighth aspect, the first type of signal is any one of the following: downlink control information DCI, a sequence, and a reference signal.

With reference to any one of the thirty-eighth aspect or the foregoing possible implementations of the thirty-eighth aspect, the meaning of the power consumption reduction information includes at least one of the following: data scheduling is not performed in a first time domain resource length; and data scheduling can be performed after a second time domain resource length.

With reference to any one of the thirty-eighth aspect or the foregoing possible implementations of the thirty-eighth aspect, the first time domain resource length or the second time domain resource length is any one of the following: one or more slots, one or more subframes, one or more milliseconds, and one or more DRX cycles.

According to a thirty-ninth aspect, a network device is provided, including: a first sending unit, configured to send third indication information, where the third indication information is used to indicate a mapping relationship between a first type of signal and a meaning of power consumption reduction information, and the first type of signal is a signal used to indicate power consumption reduction information; and a second sending unit, configured to send a second signal, where the second signal is the first type of signal.

With reference to the thirty-ninth aspect, in a first possible implementation of the thirty-ninth aspect, the third indication information is carried in RRC signaling.

With reference to the thirty-ninth aspect or the first possible implementation of the thirty-ninth aspect, in a second possible implementation of the thirty-ninth aspect, the first type of signal is any one of the following: DCI, a sequence, and a reference signal.

With reference to any one of the thirty-ninth aspect or the foregoing possible implementations of the thirty-ninth aspect, in a third possible implementation of the thirty-ninth aspect, the meaning of the power consumption reduction information includes at least one of the following: data scheduling is not performed in a first time domain resource length; and data scheduling can be performed after a second time domain resource length.

With reference to any one of the thirty-ninth aspect or the foregoing possible implementations of the thirty-ninth aspect, in a fourth possible implementation of the thirty-ninth aspect, the first time domain resource length or the second time domain resource length is any one of the following: one or more slots, one or more subframes, one or more milliseconds, and one or more DRX cycles.

According to a fortieth aspect, a communications system is provided, including the terminal device in any one of the fourteenth aspect or the possible implementations of the fourteenth aspect and the network device in any one of the fifteenth aspect or the possible implementations of the fifteenth aspect, or including the terminal device in any one of the sixteenth aspect or the possible implementations of the sixteenth aspect and the network device in any one of the seventeenth aspect or the possible implementations of the seventeenth aspect, or including the terminal device in the eighteenth aspect and the network device in the nineteenth aspect, or including the terminal device in any one of the twenty-first aspect or the possible implementations of the twenty-first aspect and the network device in any one of the twenty-second aspect or the possible implementations of the twenty-second aspect, or including the terminal device in any one of the twenty-third aspect or the possible implementations of the twenty-third aspect and the network device in any one of the twenty-fourth aspect or the possible implementations of the twenty-fourth aspect, or including the terminal device in any one of the twenty-fifth aspect or the possible implementations of the twenty-fifth aspect and the network device in any one of the twenty-sixth aspect or the possible implementations of the twenty-sixth aspect, or including the terminal device in any one of the twenty-seventh aspect or the possible implementations of the twenty-seventh aspect and the network device in any one of the twenty-eighth aspect or the possible implementations of the twenty-eighth aspect, or including the terminal device in any one of the twenty-ninth aspect or the possible implementations of the twenty-ninth aspect and the network device in the thirtieth aspect or any one of the possible implementations of the thirtieth aspect, or including the terminal device in the thirty-first aspect and the network device in the thirty-second aspect, or including the terminal device in any one of the thirty-fourth aspect or the possible implementations of the thirty-fourth aspect and the network device in any one of the thirty-fifth aspect or the possible implementations of the thirty-fifth aspect, or including the terminal device in any one of the thirty-sixth aspect or the possible implementations of the thirty-sixth aspect and the network device in any one of the thirty-seventh aspect or the possible implementations of the thirty-seventh aspect, or including the terminal device in any one of the thirty-eighth aspect or the possible implementations of the thirty-eighth aspect and the network device in any one of the thirty-ninth aspect or the possible implementations of the thirty-ninth aspect.

According to a forty-first aspect, a computer readable medium is provided, and is configured to store a computer program including computer program code. When the computer program code is run on a computer, the computer is enabled to perform the method performed by the terminal device in the foregoing aspects.

According to a forty-second aspect, a computer readable medium is provided, and is configured to store a computer program product including computer program code. When the computer program code is run on a computer, the computer is enabled to perform the method performed by the network device in each of the foregoing aspects.

According to a forty-third aspect, this application provides a chip system. The chip system includes a processor, configured to implement functions of the terminal device in the method in each of the foregoing aspect, for example, receiving or processing data and/or information in the foregoing method. In a possible design, the chip system further includes a memory. The memory is configured to store a program instruction and/or data. The chip system may include a chip, or may include a chip and another discrete component.

According to a forty-fourth aspect, this application provides a chip system. The chip system includes a processor, configured to implement functions of the network device in the method in each of the foregoing aspects, for example, receiving or processing data and/or information in the foregoing method. In a possible design, the chip system further includes a memory. The memory is configured to store a program instruction and/or data. The chip system may include a chip, or may include a chip and another discrete component.

According to a forty-fifth aspect, this application provides a computer readable storage medium. The computer readable storage medium stores a computer program, and when the computer program is run, the method performed by the terminal device in each of the foregoing aspects.

According to a forty-sixth aspect, this application provides a computer readable storage medium. The computer readable storage medium stores a computer program, and when the computer program is run, the method performed by the network device in each of the foregoing aspects.

BRIEF DESCRIPTION OF DRAWINGS

FIG. 10 is a flowchart of a signal monitoring method according to another embodiment of this application;

FIG. 11 is a flowchart of a signal monitoring method according to another embodiment of this application;

FIG. 14 is a flowchart of a signal monitoring method according to another embodiment of this application;

FIG. 15 is a schematic structural diagram of a terminal device according to an embodiment of this application;

DESCRIPTION OF EMBODIMENTS

Figure 1:
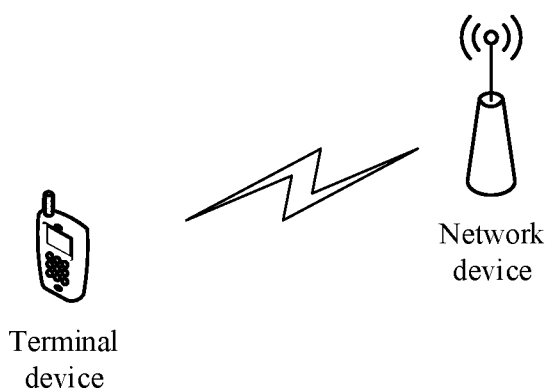
FIG. 1 is a schematic diagram of an application environment according to an embodiment of this application.

The following describes technical solutions of this application with reference to accompanying drawings.

The technical solutions of the embodiments of this application may be applied to various communications systems, such as: a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future fifth-generation (5G) system, or a new radio (NR) system.

A terminal device in the embodiments of this application may be user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

A network device in the embodiments of this application may be a device configured to communicate with the terminal device. The network device may be a base transceiver station (BTS) in the global system for mobile communications (GSM) or the code division multiple access (CDMA) system, or may be a NodeB (NB) in the wideband code division multiple access (WCDMA) system, or may be an evolved NodeB (eNB or eNodeB) in the LTE system, or may be a radio controller in a scenario of a cloud radio access network (CRAN). Alternatively, the network device may be a relay station, an access point, a vehicle-mounted device, a wearable device, a network device in a future 5G network, a network device in a future evolved PLMN network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant communications software. In addition, a specific structure of an execution body of a method provided in the embodiments of this application is not specifically limited in the embodiments of this application, provided that the execution body can run a program that records code of the method provided in the embodiments of this application to perform communication according to the method provided in the embodiments of this application. For example, the execution body of the method provided in the embodiments of this application may be the terminal device or the network device, or a function module that can invoke and execute the program in the terminal device or the network device.

For ease of understanding, the following describes several concepts in this application.

Downlink control information (DCI): The downlink control information has a plurality of formats, and may be used to indicate different control information. For example, a plurality of types of DCI are defined in a communications standard as follows:

DCI format 0_0: used to schedule uplink data of the terminal device;

DCI format 0_1: used to schedule uplink data of the terminal device;

DCI format 1_0: used to schedule downlink data of the terminal device;

DCI format 1_1: used to schedule downlink data of the terminal device;

DCI format 2_0: used to indicate a slot format;

DCI format 2_1: used to indicate interrupted transmission, which is also referred to as a preemption indication;

DCI format 2_2: used to indicate a transmit power control (TPC) command of a PUCCH or a physical uplink shared channel (PUSCH); and DCI format 2_3: used to indicate a TPC command of a sounding reference signal (SRS).

Herein, DCI format 2_x may be carried in a group common physical downlink control channel (PDCCH).

Sleep state: When the terminal device is in a sleep state, some circuits may be turned off, so as to reduce power consumption of the terminal device. For example, when the terminal device is in a sleep state, the terminal device may not perform data scheduling, that is, may not receive or send data. In a sleep state, the terminal device needs to monitor a power saving signal, that is, a signal indicating power consumption reduction information. The terminal device may determine, based on the power saving signal, whether to keep in a sleep state, that is, determine whether to switch to a normal working state.

Normal working state: When the terminal device is in a normal working state, the terminal device may perform data scheduling, that is, may receive data or send data. Therefore, in a normal working state, the terminal device needs to detect a control signal related to data scheduling.

Power saving signal: The power saving signal is a signal indicating power consumption reduction information. The power saving signal may be used to reduce power consumption. The power saving signal is usually classified into two types: One is a wake-up signal, and a function of the wake-up signal is to notify, when the terminal device is in a sleep state, the terminal device of a period of time after which the terminal device wakes up to perform normal data receiving and sending. The other is a go-to-sleep signal, and a function of the go-to-sleep signal is to notify, when the terminal device is in a normal working state (that is, a non-sleep state), the terminal device of a period of time after which the terminal device can enter the sleep state to reduce power consumption. The power saving signal may be specifically implemented in two manners. In a first manner, the power saving signal may be implemented based on DCI. An advantage of the first manner is that reliability is high, and a probability of missing detection/false detection is low. For example, in this application, DCI indicating the power saving signal may be referred to as a DCI format 3. In a second manner, the power saving signal may be implemented based on a sequence or a reference signal (RS). An advantage of the second manner is that DCI does not need to be designed, and complexity of blindly detecting the DCI by the terminal device is not increased.

Slot structure: The slot structure is classified into three types: downlink (DL), uplink (UL), and flexible (X). The terminal device can only receive a downlink signal within a time in which the slot structure is indicated as DL. The terminal device can only send an uplink signal within a time in which the slot structure is indicated as UL. The terminal device can receive a downlink signal and send an uplink signal within a time in which the slot structure is indicated as X. The slot structure may be indicated by using two methods. In a first method, the network device configures a semi-static slot structure for the terminal device by using RRC signaling. An effective time of the slot structure is usually relatively long, that is, the slot structure is not changed into another configuration in a short time, and may be periodic. In a second method, the network device indicates a dynamic slot structure to the terminal device. An effective time of the slot structure is usually relatively short, that is, the slot structure may be changed into another slot structure in a short time by using another piece of DCI in a format of 2_0. For example, the dynamic slot structure may be indicated by using a DCI format 2_0.

Blind detection (BD): When receiving DCI sent to the terminal device, the terminal device needs to blindly detect, in a downlink control area, a PDCCH sent to the terminal device. To be specific, the terminal device listens to many PDCCH candidates, to check whether there is a PDCCH candidate that is sent to the terminal device. In a process of blindly detecting the DCI, the terminal device blindly detects different DCI formats. Because lengths of different DCI formats are different, the terminal device needs to perform decoding for a plurality of times. For example, a DCI format that needs to be blindly detected is 20 bits, and another DCI format that needs to be blindly detected is 30 bits. For same input information, the terminal device performs decoding once by using an output result length of 20 bits, and then performs decoding once by using an output result length of 30 bits. If lengths of two DCI formats are the same, the two DCI formats are usually scrambled by using different radio network temporary identifiers (RNTI). In this case, in a process of blindly detecting different DCI formats, the terminal device needs to separately descramble the different formats. Because of the foregoing operations, more DCI formats blindly detected by the terminal device result in more decoding/descrambling operations that needs to be performed by the terminal device and higher power consumption of the terminal device.

FIG. 1 is a schematic diagram of an application scenario according to an embodiment of this application. As shown in FIG. 1, the application scenario may include a terminal device and a network device. For specific descriptions of the terminal device and the network device, refer to the foregoing related descriptions. In an example, the terminal device may be a mobile terminal, and the network device may be an access network device. As shown in FIG. 1, the terminal device may access a network by using the network device, and the terminal device and the network device may communicate with each other by using a radio link.

Figure 2:
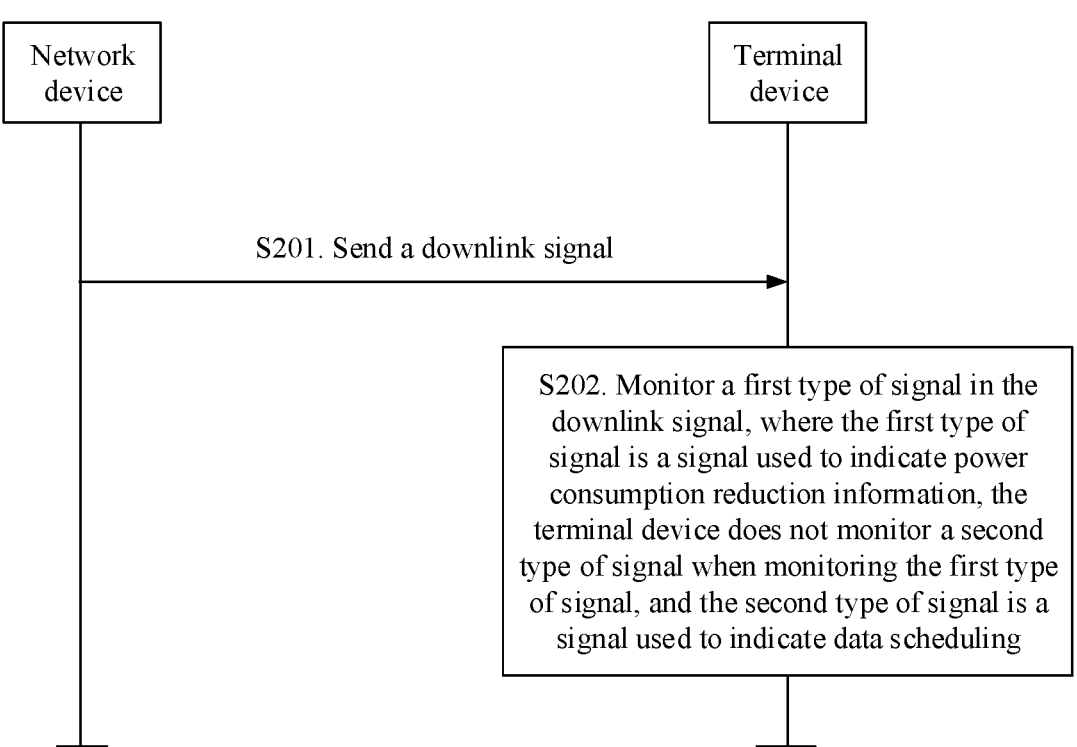
FIG. 2 is a flowchart of a signal monitoring method according to an embodiment of this application.

FIG. 2 is a schematic diagram of a signal monitoring method according to an embodiment of this application. The method in FIG. 2 may be performed by a terminal device and a network device, or may be performed by a chip of the terminal device and a chip of the network device. An example in which the method is performed by the terminal device and the network device is used below for description. The method in FIG. 2 includes the following steps:

S201. The terminal device receives a downlink signal, and correspondingly, the network device sends the downlink signal.

Optionally, the downlink signal may be a downlink channel, for example, a PDCCH. Alternatively, the downlink signal may be of another type, for example, a reference signal or a sequence.

S202. The terminal device monitors a first type of signal in the downlink signal, where the first type of signal is a signal used to indicate power consumption reduction information, the terminal device does not monitor a second type of signal when monitoring the first type of signal, and the second type of signal is a signal used to indicate data scheduling. Correspondingly, the network device sends only one of the first type of signal and the second type of signal in a same interval.

Optionally, the first type of signal may be used to indicate power consumption reduction information. The power consumption reduction information may be used to indicate when the terminal device enters a sleep state, or when the terminal device wakes up from a sleep state, or other control signaling related to a sleep state. In other words, the terminal device may perform, based on indication content of the first type of signal, an activity related to the sleep state or switching between the sleep state and a normal working state. Optionally, the first type of signal may be the foregoing power saving signal. The first type of signal may be DCI, a sequence, or a reference signal.

The power consumption reduction information may include a plurality of meanings. For example, the power consumption reduction information may indicate that the terminal device does not perform data scheduling in a first time domain resource length, or indicate that the terminal device can perform data scheduling after a second time domain resource length. A unit of a time domain resource length (for example, the first time domain resource length or the second time domain resource length) in this embodiment of this application may be, for example, a slot, a subframe, or a millisecond (ms), or may be another time unit. This is not limited in this application. For example, the first time domain resource length and the second time domain resource length each may indicate one or more slots, one or more subframes, or one or more milliseconds.

In addition, the time domain resource length in this embodiment of this application may alternatively be indicated by a discontinuous reception (DRX) cycle. For example, DRX may be configured for a terminal in an RRC connected mode. To be specific, the terminal does not continuously monitor a PDCCH, but monitors the PDCCH in on duration and does not monitor the PDCCH in an opportunity for DRX, so as to reduce power consumption of the terminal. One on duration and one opportunity for DRX constitute one DRX cycle.

The power consumption reduction information may directly indicate that data scheduling is not performed in one or more DRX cycles, that is, units of the first time domain resource length and the second time domain resource length each may be, for example, a DRX cycle or DRX on duration.

In addition, the unit of the time domain resource length (for example, the first time domain resource length or the second time domain resource length) in this embodiment of this application may alternatively be indicated by a downlink control channel monitoring occasion (PDCCH monitoring occasion). For example, that the power consumption reduction information indicates that data scheduling is not performed in the first time domain resource length may include: The power consumption reduction information may indicate that data scheduling is not performed in one or more PDCCH monitoring occasions. In this case, the terminal device does not monitor the second type of signal in the one or more PDCCH monitoring occasions. For another example, that the power consumption reduction information indicates that data scheduling can be performed after the second time domain resource length includes: The power consumption reduction information indicates that data scheduling can be performed after one or more PDCCH monitoring occasions. In this case, the terminal device starts to monitor the second type of signal after the one or more PDCCH monitoring occasions.

The PDCCH monitoring occasion may be determined based on a configuration of the network device. For example, the network device configures one or more search spaces (search space) for the terminal device, and the terminal device determines the PDCCH monitoring occasion based on a configuration status of the search space.

Figure 22:
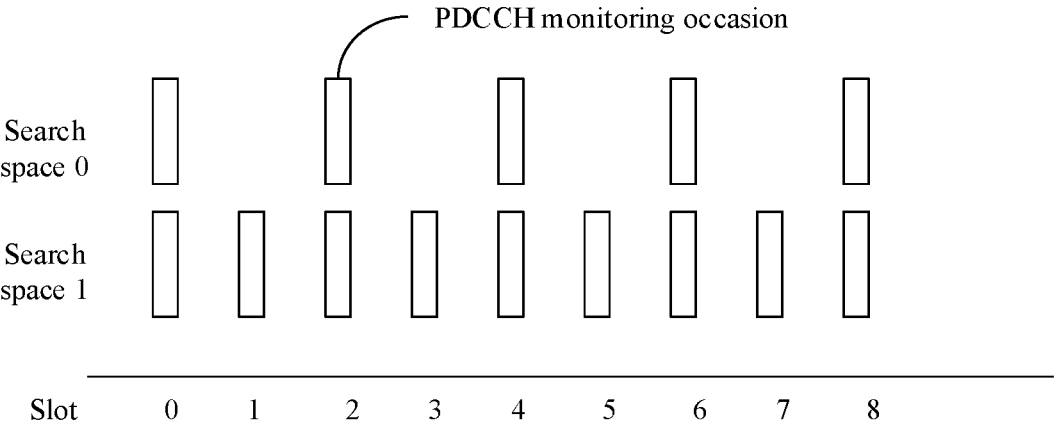
FIG. 22 is a schematic diagram of a PDCCH monitoring occasion according to an embodiment of this application.

For example, FIG. 22 is a schematic diagram of a PDCCH monitoring occasion according to an embodiment of this application. As shown in FIG. 22, it is assumed that the network device configures only one search space for the terminal device, and the search space may be a search space 0 or a search space 1. A monitoring period of the search space 0 is two slots. If the power consumption reduction information indicates that the terminal device does not perform data scheduling in subsequent two PDCCH monitoring occasions, it is equivalent to that the terminal device does not perform data scheduling in four slots. A monitoring period of the search space 1 is one slot. If the power consumption reduction information indicates that the terminal device does not perform data scheduling in subsequent two PDCCH monitoring occasions, it is equivalent to that the terminal device does not need to monitor the second type of signal in two slots.

For another example, still referring to FIG. 22, it is assumed that the network device configures two search spaces for the terminal device, which are a search space 0 and a search space 1. A monitoring period of the search space 0 is two slots, and a monitoring period of the search space 1 is one slot, as shown in FIG. 22. In this case, for the terminal device, the indication of the power consumption reduction information may be understood in different manners. Correspondingly, the network device needs to send a signal in a same understanding manner as the terminal device. For example, the network device and the terminal device need to agree on using a same understanding manner to send a signal and monitoring a signal. For example, the network device may send indication information to the terminal device, to indicate a specific understanding manner to be used by the terminal device to perform monitoring. The indication information may be explicit indication information or implicit indication information. The indication information may be sent to the terminal device in advance, or may be carried in the power consumption reduction information. This is not limited in this embodiment of this application. Alternatively, a specific understanding manner in the following that is to be used may be specified in a communications standard:

In a first understanding manner, it may be understood that the PDCCH monitoring occasion indicates PDCCH monitoring occasions of all search spaces. In other words, the PDCCH monitoring occasion indicates a union set of the PDCCH monitoring occasions of all the search spaces. For example, still referring to FIG. 22, the terminal device needs to monitor a search space 0 or a search space 1 in each of a slot 0 to a slot 8. Therefore, each of the slot 0 to the slot 8 includes one PDCCH monitoring occasion. If the power consumption reduction information indicates that the terminal device does not perform data scheduling in subsequent two PDCCH monitoring occasions, it is equivalent to that the terminal device does not need to monitor the second type of signal in two slots.

In a second understanding manner, it may be understood that the PDCCH monitoring occasion is a PDCCH monitoring occasion for a specific search space. For example, it is assumed that the PDCCH monitoring occasion is for a search space 0. In this case, there is one PDCCH monitoring occasion in every two slots. If the power consumption reduction information indicates that the terminal device does not perform data scheduling in subsequent two PDCCH monitoring occasions, it is equivalent to that the terminal device does not need to monitor the second type of signal in four slots. Similarly, it is assumed that the PDCCH monitoring occasion is for a search space 1. In this case, there is one PDCCH monitoring occasion in each slot. If the power consumption reduction information indicates that the terminal device does not perform data scheduling in subsequent two PDCCH monitoring occasions, it is equivalent to that the terminal device does not need to monitor the second type of signal in two slots.

It may be understood that, in the foregoing two implementations, if a same PDCCH monitoring occasion may be obtained based on configurations of the two search spaces, results of the two methods are the same.

In addition, based on the second implementation, when the terminal device monitors or does not monitor the second type of signal, the terminal device may monitor or may not monitor the second type of signal only in a specific search space, or may monitor or may not monitor the second type of signal in all search spaces. For example, still referring to FIG. 22, it is assumed that the PDCCH monitoring occasion is for a search space 0. In this case, the network device indicates, by using the power consumption reduction information, that the terminal device does not to receive the second type of signal in subsequent two PDCCH monitoring occasions. In other words, the terminal device does not need to monitor the second type of signal in subsequent four slots. There are two implementations herein. In a first implementation, the terminal device does not monitor the second type of signal in the search space 0 in the four slots. In a second implementation, the terminal device does not monitor the second type of signal in any search space in the four slots.

The first type of signal may indicate different meanings of the power consumption reduction information. For example, if the first type of signal is DCI, different values assigned to the DCI may indicate different meanings of the power consumption reduction information. In an example, Table 1 shows a mapping relationship between a value assigned to the DCI and a meaning of the power consumption reduction information.

TABLE 1

| Bit information in the DCI | Meaning |
| --- | --- |
| 00 | No scheduling is performed in three slots |
| 01 | No scheduling is performed in two slots |
| 10 | Scheduling is performed after one slot |
| 11 | Scheduling is performed after two slots |

Alternatively, if the first type of signal is a sequence, different meanings of the power consumption reduction information may be indicated by different sequences. In an example, Table 2 shows a mapping relationship between different sequences and meanings of the power consumption reduction information that are indicated by the sequences.

TABLE 2

| Sequence | Meaning |
| --- | --- |
| Sequence 1 | No scheduling is performed in three slots |
| Sequence 2 | No scheduling is performed in two slots |
| Sequence 3 | Scheduling is performed after one slot |
| Sequence 4 | Scheduling is performed after two slots |

Alternatively, if the first type of signal is a reference signal, different meanings of the power consumption reduction information may be indicated by different reference signals. In an example, Table 3 shows a mapping relationship between different reference signals and meanings of the power consumption reduction information that are indicated by the reference signals.

TABLE 3

| Reference signal | Meaning |
| --- | --- |
| Reference signal 1 | No scheduling is performed in three slots |
| Reference signal 2 | No scheduling is performed in two slots |
| Reference signal 3 | Scheduling is performed after one slot |
| Reference signal 4 | Scheduling is performed after two slots |

It should be noted that the meanings of the power consumption reduction information that are listed in Table 1 to Table 3 are merely examples, and the power consumption reduction information may have other meanings. This is not limited in this application. In addition, the mapping relationship between the first type of signal and the meaning of the power consumption reduction information in Table 1 to Table 3 is also merely an example, and there may be another mapping relationship between the first type of signal and the meaning of the power consumption reduction information.

Optionally, the mapping relationship may be predefined, or may be indicated by the network device. For example, the network device may send third indication information to the terminal device, and correspondingly, the terminal device receives the third indication information from the network device. The third indication information is used to indicate the mapping relationship. For example, the third indication information may be semi-static indication information, or may be dynamic indication information.

Optionally, the second type of signal may be a signal used to indicate data scheduling. For example, the second type of signal may be control signaling used to indicate data scheduling. In other words, the terminal device may receive or send data based on indication content of the second type of signal. The second type of signal may be usually DCI. For example, the second type of signal may be the DCI format 0_0, the DCI format 0_1, the DCI format 1_0, or the DCI format 1_1 described above.

If the first type of signal is DCI, the terminal device may monitor the first type of signal in the downlink signal through blind detection. If the first type of signal is a sequence or a reference signal, the terminal device may monitor the first type of signal in the downlink signal through correlation detection or the like. This application is not limited to correlation detection, and another algorithm may alternatively be used to monitor the sequence or the reference signal.

In this embodiment of this application, after entering a sleep state, the terminal device does not perform data scheduling. Therefore, the terminal device only needs to monitor the first type of signal indicating power consumption reduction information, but does not need to monitor the second type of signal indicating data scheduling. When the terminal device is in a normal working state, the terminal device does not need to monitor the first type of signal, and only needs to monitor the second type of signal. In this embodiment of this application, the network device does not send the second type of signal when sending the first type of signal. Therefore, the terminal device does not need to monitor the first type of signal and the second type of signal at the same time. In this monitoring manner, types of signals monitored by the terminal device at the same time can be reduced, so as to reduce power consumption of the terminal device.

The following describes a process in which the terminal device switches from the normal working state to the sleep state. The terminal device may perform the foregoing switching in two manners.

In a first manner, the terminal device determines whether the second type of signal is detected in a preset third time domain resource length, where the second type of signal is a signal used to indicate data scheduling. The terminal device starts to monitor the first type of signal when the second type of signal is not detected in the preset third time domain resource length, where the first type of signal is a signal used to indicate power consumption reduction information.

Optionally, the third time domain resource length may start from a location, in a time domain resource, at which the terminal device receives a second type of signal. For example, after receiving a second type of signal, the terminal device may monitor whether a new second type of signal can be detected in the third time domain resource length after the second type of signal. If the terminal device detects no new second type of signal, it indicates that the network device is to start to send the first type of signal. Therefore, the terminal device may immediately start to monitor the first type of signal after the third time domain resource length. Correspondingly, after sending a second type of signal, the network device may wait for the third time domain resource length, and then start to send the first type of signal.

Optionally, the terminal device does not monitor the first type of signal when monitoring the second type of signal.

Optionally, when detecting the second type of signal in the preset third time domain resource length, the terminal device may continue to monitor the second type of signal, and does not monitor the first type of signal.

In this embodiment of this application, when the network device does not send the second type of signal in the preset third time domain resource length, it indicates that the network device is to send the first type of signal. Therefore, the terminal device may monitor the first type of signal after the third time domain resource length, and the network device does not need to additionally send indication information that indicates to start to monitor the first type of signal, so as to reduce signaling overheads.

Figure 3:
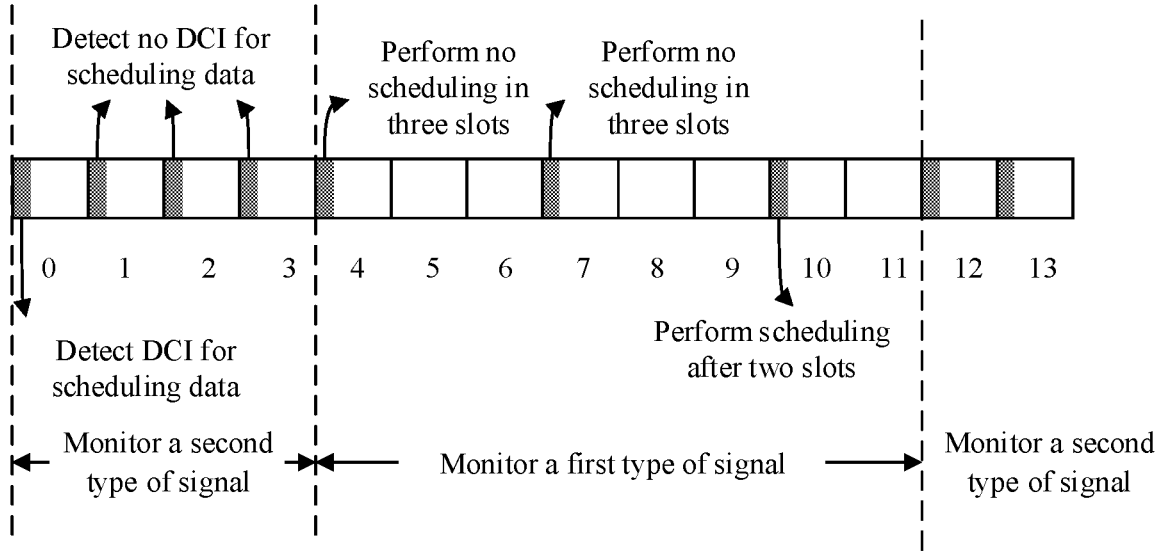
FIG. 3 is a schematic diagram of a process of a method for periodically monitoring a first type of signal according to an embodiment of this application.

For example, FIG. 3 is a specific schematic diagram of periodically monitoring a first type of signal. In FIG. 3, the preset third time domain resource length is three time domain resource units, and the time domain resource unit may be a slot or a millisecond (ms), or may be another time unit. In FIG. 3, an example in which the first type of signal is DCI is used for description. However, the example in FIG. 3 is also applicable to a case in which the first type of signal is a sequence or a reference signal. If the terminal device detects no second type of signal, for example, DCI for scheduling data, in three consecutive time domain resource units in a normal state, the terminal device switches from the normal working state to the sleep state. The terminal device may blindly detect the first type of signal periodically. For example, the first type of signal may be DCI indicating power consumption reduction information. The monitoring period may be configured by the network device.

As shown in FIG. 3, the terminal device first monitors the DCI for scheduling data based on the configuration of the network device. The terminal device detects the second type of signal, for example, the DCI for scheduling data, in a slot 0, and then detects no second type of signal in next three consecutive slots (a slot 1 to a slot 3). Starting from a slot 4, the terminal device stops monitoring the second type of signal, and starts to monitor the first type of signal, for example, the DCI indicating power consumption reduction information.

In a second manner, the terminal device receives second indication information from the network device, and correspondingly, the network device receives the second indication information from the terminal device, where the second indication information indicates the terminal device to start to monitor the first type of signal, and the first type of signal is a signal used to indicate power consumption reduction information. The terminal device starts to monitor the first type of signal after receiving the second indication information, where the terminal device does not monitor the second type of signal when monitoring the first type of signal, and the second type of signal is a signal used to indicate data scheduling.

Optionally, the second indication information is carried in any one of the following: radio resource control (RRC) signaling, a media access control control element (MAC CE), and DCI.

In this embodiment of this application, the terminal device starts to monitor the first type of signal after receiving the second indication information. Therefore, a manner in which the terminal device starts to monitor the first type of signal is provided, so as to improve communication efficiency.

After receiving the second indication information, the terminal device may start to monitor the first type of signal after a preset time period. The preset time period may be several slots, several milliseconds, or several DRX cycles. For example, the terminal device switches from the normal state to the sleep state after K slots, where K is an integer greater than 0. In other words, the terminal device does not monitor the first type of signal before the K slots, but monitors the first type of signal after the K slots. This is because the terminal device needs to perform data processing after receiving a signal, so as to extract valid information, and learn from the valid information that the network device needs the terminal device to switch a state. However, it takes some time to perform data processing. The preset time period, for example, a value of K, may be predefined in a communications standard, or may be preconfigured by the network device for the terminal device, or may be determined based on a processing capability of the terminal device. The terminal device may report the processing capability of the terminal device to the network device in advance.

In some examples, the terminal device may immediately start to monitor the first type of signal after the preset time period. For example, if the terminal device receives the second indication information in a slot 3, to indicate to start to monitor the first type of signal, and the preset time period is 8 (K=8) slots, the terminal device starts to monitor the first type of signal in a slot 11. If the terminal device periodically monitors the first type of signal, for example, a monitoring period is five slots, the terminal device may periodically monitor the first type of signal in slots such as the slot 11 and a slot 16. If the terminal device determines, based on a current first type of signal, a location for monitoring a next first type of signal, the terminal device may determine, after the slot 11 based on a first type of signal detected in the slot 11, a slot for monitoring the next first type of signal.

In some examples, in a case of periodic monitoring, the terminal device may further search for the first periodic available value after the preset time period for monitoring. For example, if a monitoring period is five slots, the terminal device may periodically monitor the first type of signal in a slot whose sequence number is 5n, that is, perform monitoring in slots such as a slot 0, a slot 5, and a slot 10, where n is an integer greater than or equal to 0. If the terminal device receives the second indication information in a slot 3, to indicate to start to monitor the first type of signal, and the preset time period is 8 (K=8) slots, the terminal device starts to search for a periodic available value from a slot 11, and then starts to monitor the first type of signal in a slot 15.

In some examples, the second indication information may alternatively indicate a location at which the terminal device starts to monitor the first type of signal in the time domain resource. If the terminal device receives the second indication information in a slot 3, to indicate to start to monitor the first type of signal in a slot 13, the terminal device may start to monitor the first type of signal from the slot 13.

The following describes a process in which the terminal device monitors a signal in a sleep state. The terminal device may periodically monitor the first type of signal, or may aperiodically monitor the first type of signal. Correspondingly, the network device may periodically send the first type of signal, or may aperiodically send the first type of signal.

When the terminal device periodically monitors the first type of signal, the terminal device may determine, according to an indication of the first type of signal, to continue to monitor the first type of signal or to start to monitor the second type of signal. In other words, the terminal device determines to keep in a sleep state or to switch to a normal working state.

For example, that the terminal device periodically monitors the first type of signal includes: The terminal device detects a first signal, where the first signal may indicate that data scheduling is not performed in N periods or the first time resource length, and N is an integer greater than 0. In this case, the terminal device monitors the first type of signal in the first period after the N periods, or monitors the first type of signal in the first period after the first time resource length.

For another example, that the terminal device periodically monitors the first type of signal includes: The terminal device monitors a first signal, where the first signal indicates that data scheduling can be performed after M periods or the second time resource length. In this case, the terminal device starts to monitor the second type of signal after the M periods, or starts to monitor the second type of signal after the second time resource length.

The first time resource length or the second time resource length may be, for example, one or more slots, one or more subframes, one or more milliseconds, or one or more DRX cycles, or may be represented by another time unit.

For example, still referring to FIG. 3, it is assumed that the monitoring period configured by the network device is three slots, and the terminal device monitors the second type of signal by using three slots as a period. The terminal device detects the second type of signal in a slot 4, where the second type of signal indicates that the terminal device does not perform data scheduling before a next slot for periodically monitoring the first type of signal. In other words, the terminal device does not receive the second type of signal, for example, DCI for scheduling data, that is, the terminal device may be in a sleep state before the next slot for periodically monitoring the first type of signal. Therefore, the terminal device does not need to monitor the first type of signal and the second type of signal in a slot 5 and a slot 6. Then, the terminal device monitors the first type of signal in a next location for performing periodic monitoring, that is, a slot 7. If an indication that is the same as that in the slot 4 is received in the slot 7, the terminal device does not monitor the first type of signal and the second type of signal in a slot 8 and a slot 9. Then, the terminal device detects the first type of signal in a slot 10, where the first type of signal indicates that the terminal device may be scheduled to transmit data after two slots. In this case, the terminal device may re-monitor the second type of signal after the two slots (that is, a slot 12), and stop monitoring the first type of signal.

When the first type of signal is aperiodically sent, a location of a time domain resource of a next to-be-monitored signal may be indicated by a current first type of signal. For example, that the terminal device monitors a first type of signal in the downlink signal may include: The terminal device detects a first signal, where the first signal is the first type of signal. The terminal device may determine a location of a next to-be-monitored signal in a time domain resource based on the first signal, where the next to-be-monitored signal is the first type of signal or the second type of signal. Correspondingly, the downlink signal sent by the network device may include the first signal.

For example, if the first signal indicates that data scheduling is not performed in the first time domain resource length, the network device may start to send a next first type of signal at a location after the first time domain resource length. Correspondingly, the terminal device starts to monitor the first type of signal from the location after the first time domain resource length in the time domain resource.

It is assumed that a location of the first signal in the time domain resource is a first location, and the terminal device may start to monitor the next first type of signal at a location after the first location after the first time domain resource length.

For example, if the first signal indicates that data scheduling can be performed after the second time domain resource length, the network device may start to send the second type of signal at a location after the second time domain resource length. Correspondingly, the terminal device starts to monitor the second type of signal from the location after the second time domain resource length in the time domain resource.

It is assumed that a location of the first signal in the time domain resource is a first location, and the terminal device may start to monitor the second type of signal at a location after the first location after the second time domain resource length.

Figure 4:
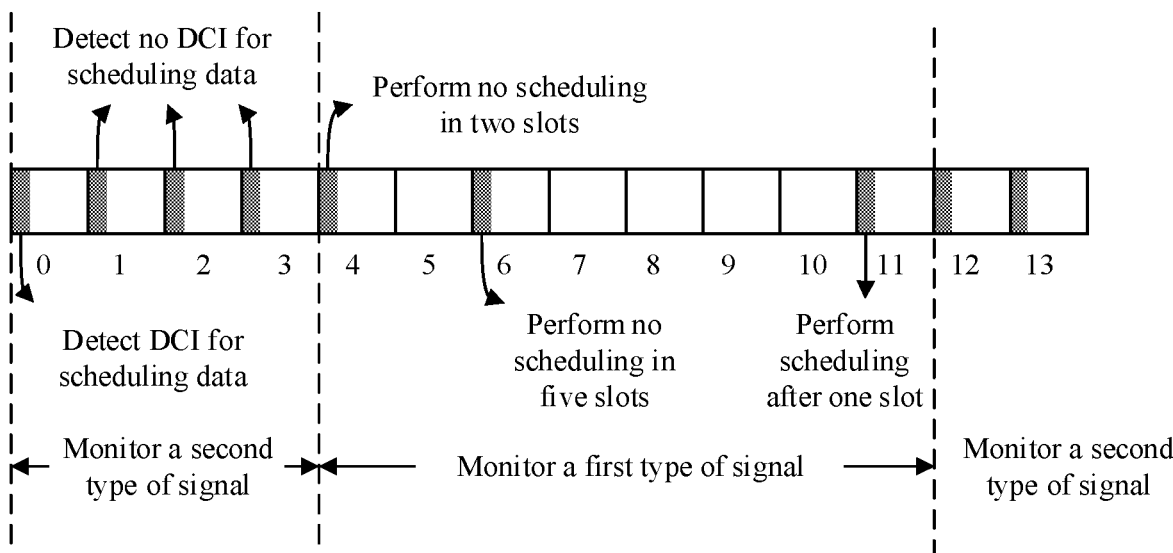
FIG. 4 is a schematic diagram of a process of a method for aperiodically monitoring a first type of signal according to an embodiment of this application.

For example, FIG. 4 is a specific schematic diagram of aperiodically monitoring a first type of signal. A manner in which the terminal device switches from a normal working state to a sleep state in FIG. 4 is similar to that in FIG. 3. To be specific, if the terminal device detects no second type of signal, for example, DCI for scheduling data, in three consecutive slots in a normal working state, the terminal device switches from the normal working state to the sleep state. As shown in FIG. 4, the terminal device detects the first type of signal in a slot 4, where the first type of signal indicates that the terminal device does not perform data scheduling in next two slots including the current slot. In other words, the terminal device does not receive the second type of signal, for example, the DCI for scheduling data, that is, the terminal device is in a sleep state in the next two slots including the current slot. Therefore, the terminal device does not monitor the first type of signal in a slot 5. Then, the terminal device detects the first type of signal in a slot 6, where the first type of signal indicates that the terminal device does not perform data scheduling in next five slots including the current slot. Therefore, the terminal device does not monitor the first type of signal in a slot 7, a slot 8, a slot 9, and a slot 10. Then, the terminal device detects the first type of signal in a slot 11, where the first type of signal indicates that the terminal device may be scheduled to transmit data after one slot. Therefore, the terminal device starts to monitor the second type of signal from a slot 12.

The following continues to describe a process in which the terminal device monitors a signal when a conflict or an exception occurs in a system. That a conflict occurs in a system may mean that the terminal device receives indication information indicating that the first location in the time domain resource is an uplink location, but the first location is a predetermined location used for a next to-be-monitored first type of signal. Therefore, the terminal device cannot monitor the first type of signal at the first location. That an exception occurs in a system may mean that the terminal device detects no to-be-monitored first type of signal at a predetermined location of the first type of signal.

In a manner, if the terminal device periodically monitors the first type of signal, when the predetermined first location for monitoring the first type of signal conflicts with a slot structure or an uplink-downlink configuration, the network device may consider, by default, that the network device indicates that data scheduling is not performed in one period after the first location. Correspondingly, if the network device determines that data scheduling is not performed in one period after the first location, the network device may configure, as an uplink location, the predetermined first location for periodically monitoring the first type of signal, to implicitly indicate, to the terminal device, that data scheduling is not performed in one period, and the terminal device may continue to stay in a sleep state.

For example, the terminal device receives first indication information, where the first indication information indicates that the first location in the time domain resource is an uplink location, and the first location is a location for periodically monitoring the first type of signal. The terminal device determines not to monitor the first type of signal at a location between the first location and a next location for periodically monitoring the first type of signal. Alternatively, the terminal device may monitor neither the first type of signal nor the second type of signal at a location between the first location and a next location for periodically monitoring the first type of signal. The next location for periodically monitoring the first type of signal is a next location for periodically monitoring the first type of signal after the first location.

Figure 5:
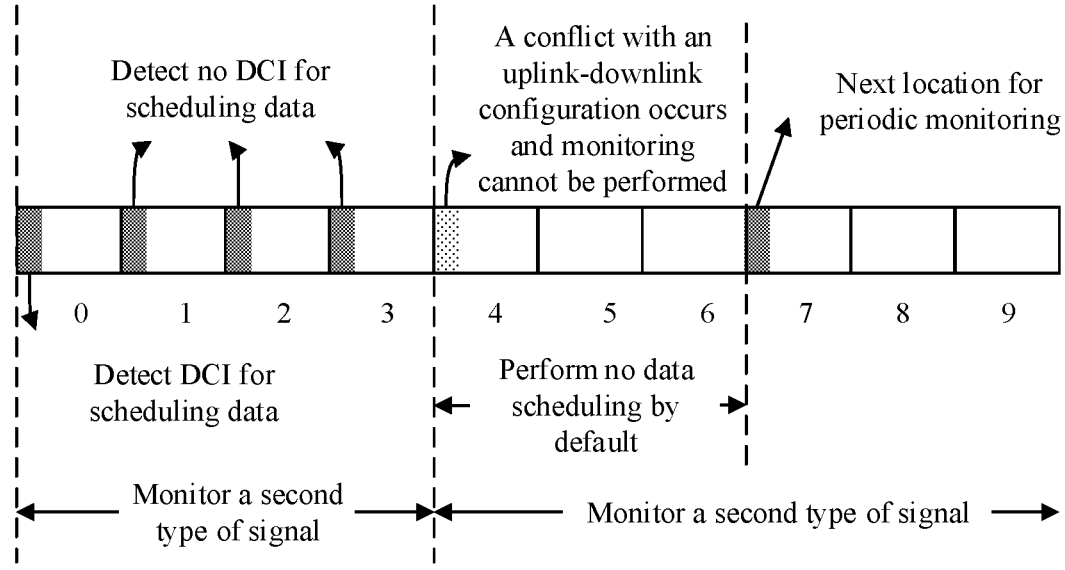
FIG. 5 is a schematic diagram of a process of a method for periodically monitoring a first type of signal according to another embodiment of this application.

FIG. 5 is a schematic diagram of a process of a method for periodically monitoring a first type of signal according to another embodiment of this application. A manner in which the terminal device switches from a normal working state to a sleep state in FIG. 5 is similar to that in FIG. 3. To be specific, if the terminal device detects no second type of signal, for example, DCI for scheduling data, in three consecutive slots in a normal working state, the terminal device switches from the normal working state to the sleep state. The example in FIG. 5 mainly focuses on a case in which a location for periodically monitoring a signal conflicts with a slot structure or an uplink-downlink configuration. The terminal device considers, by default, that the network device does not indicate the terminal device to perform data scheduling, in other words, the terminal device may be always in a sleep state, before a next slot for periodically monitoring the first type of signal. Therefore, the terminal device may not monitor the first type of signal before the next slot for periodically monitoring the first type of signal.

As shown in FIG. 5, it is assumed that the terminal device monitors the first type of signal by using three slots as a period. Assuming that a slot 4 is a predetermined location for periodically monitoring the first type of signal, and the first indication information indicates that a location, in the slot 4, at which the terminal device monitors the first type of signal is an uplink location, the terminal device cannot monitor the first type of signal in the slot 4. In this case, the terminal device does not monitor the first type of signal before a next location (that is, a slot 7) for periodically monitoring the first type of signal, and considers, by default, that the network device does not schedule the terminal device to transmit data before the slot 7. Therefore, the terminal device does not monitor the first type of signal in a slot 5 and a slot 6, and monitors the first type of signal until the slot 7. Correspondingly, the network device also knows that the first type of signal cannot be sent to the terminal device in the slot 4. Therefore, the network device also follows a same rule, and sends the first type of signal to the terminal device until the slot 7.

In another manner, when the predetermined first location for monitoring the first type of signal conflicts with a slot structure or an uplink-downlink configuration, the network device may send the first type of signal after the first location. Correspondingly, the terminal device may monitor the first type of signal after the first location.

For example, if the terminal device periodically monitors the first type of signal, the network device may send first indication information, and correspondingly, the terminal device may receive the first indication information. The first indication information indicates that the first location in the time domain resource is an uplink location, and the first location is a location for periodically sending the first type of signal. The network device sends the first type of data at a second location in the time domain resource, where the second location is located between the first location and a next location for periodically sending the first type of signal. Correspondingly, the terminal device may monitor the first type of signal at the at least one second location after the first location. Optionally, the terminal device may sequentially monitor the first type of signal at the at least one second location after the first location until the first type of signal is detected, or until a next location for periodically monitoring the first type of signal is detected.

For another example, if the terminal device aperiodically monitors the first type of signal, the network device may send first indication information, and correspondingly, the terminal device may receive the first indication information. The first indication information indicates that the first location in the time domain resource is an uplink location, the first location is a location of a next to-be-monitored signal that is determined based on the first signal, and the next to-be-monitored signal is the first type of signal. The network device sends the first type of signal at a second location of the time domain resource, where the second location is located after the first location. Correspondingly, the terminal device may monitor the first type of signal at the at least one location after the first location. Optionally, the terminal device may sequentially monitor the first type of signal at the at least one second location after the first location until the first type of signal is detected.

The first indication information may be signaling used to indicate a slot structure and/or an uplink-downlink configuration of a system. For example, the first indication information may indicate that the first location is an uplink slot, or indicate that the first location is an uplink location. The first indication information may be semi-statically configured signaling or signaling that dynamically indicates a slot structure.

The second location may be a downlink location or a flexible location. In some examples, the terminal device keeps monitoring the first type of signal at the at least one second location after the first location until the first type of signal is detected, and a longer time for monitoring a signal indicates higher power consumption of the terminal device. Therefore, the network device may send the first type of signal at a second location closest to the first location as much as possible, so that the terminal device detects the first type of signal as soon as possible, thereby reducing power consumption of the terminal device.

Figures 6A, 6B:
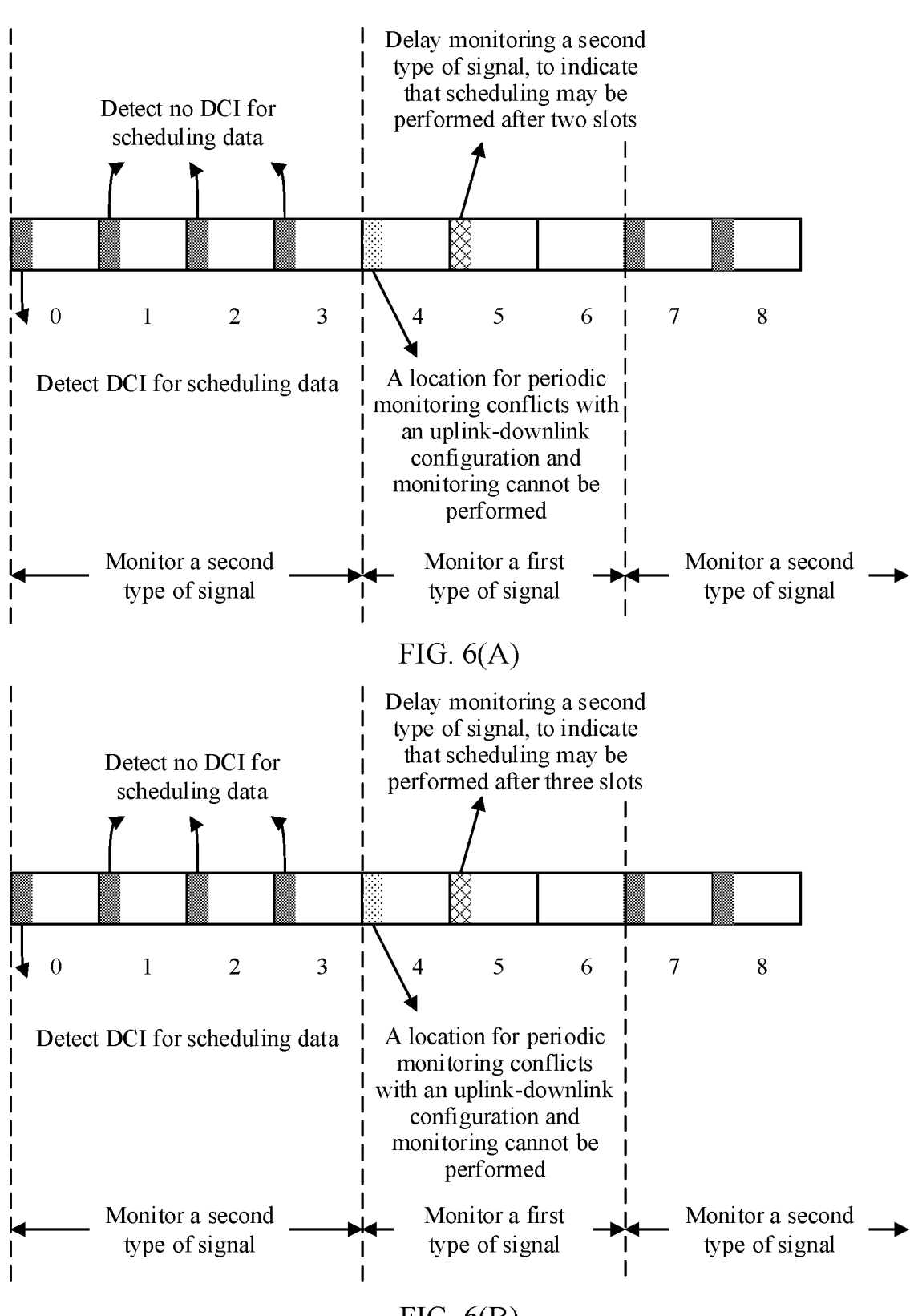
FIG. 6(A) and FIG. 6(B) are a schematic diagram of a process of a method for periodically monitoring a first type of signal according to another embodiment of this application.

For example, FIG. 6(A) and FIG. 6(B) are a schematic diagram of a process of periodically monitoring a first type of signal according to another embodiment of this application. A manner in which the terminal device switches from a normal working state to a sleep state in FIG. 6(A) and FIG. 6(B) is similar to that in FIG. 3. To be specific, if the terminal device detects no second type of signal, for example, DCI for scheduling data, in three consecutive slots in a normal state, the terminal device switches from the normal working state to the sleep state. The example in FIG. 6(A) and FIG. 6(B) also focuses on a case in which a location for periodically monitoring a signal conflicts with a slot structure or an uplink-downlink configuration. In this case, the terminal device may search backwards for a second location that is not conflicted with before a next location for periodically monitoring the first type of signal, and blindly detect the first type of signal at the second location. For example, the second location may be a closest downlink or flexible slot after a location that is conflicted with.

As shown in FIG. 6(A) and FIG. 6(B), it is assumed that the first type of signal is monitored by using three slots as a period. Assuming that a slot 4 is a predetermined location for periodically monitoring the first type of signal, and the first indication information indicates that a location, in the slot 4, at which the terminal device monitors the first type of signal is an uplink location, the terminal device cannot monitor the first type of signal in the slot 4. In this case, the terminal device may search backwards for a closest slot that does not conflict with a semi-statically configured or dynamically indicated slot structure before a next location for periodically monitoring the first type of signal, and blindly detect the first type of signal in the slot. As shown in FIG. 6(A) and FIG. 6(B), a slot structure of a slot 5 does not conflict with the semi-statically configured or dynamically indicated slot structure. Therefore, the terminal device may blindly detect the first type of signal in the slot 5. The network device also knows that DCI serving as the first type of signal cannot be sent to the terminal device in the slot 4. Therefore, the network device also follows a same rule, and sends the DCI serving as the first type of signal to the terminal device in the slot 5.

Figures 7A, 7B:
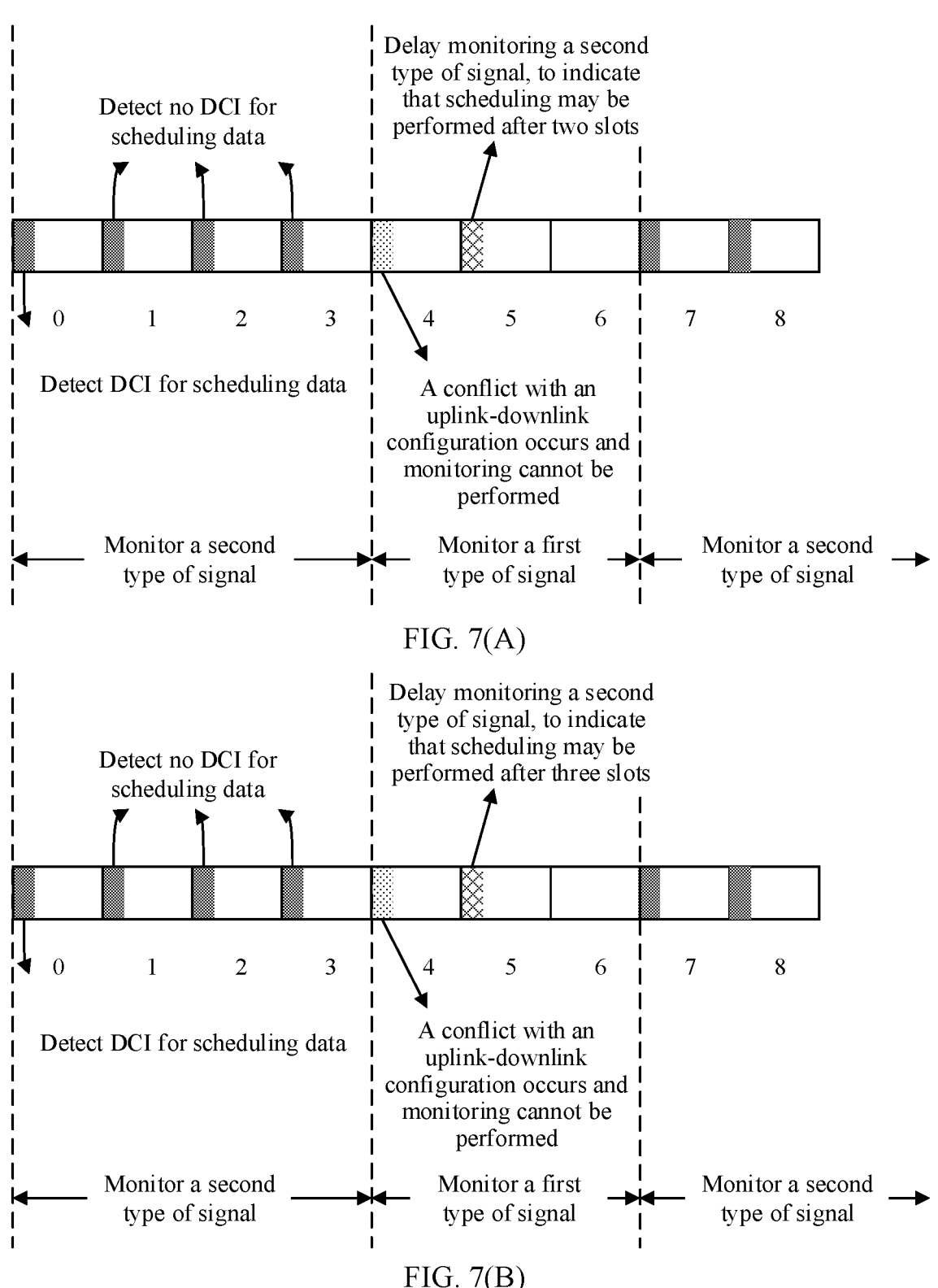
FIG. 7(A) and FIG. 7(B) are a schematic diagram of a process of a method for aperiodically monitoring a first type of signal according to another embodiment of this application.

For another example, FIG. 7(A) and FIG. 7(B) are a schematic diagram of a process of aperiodically monitoring a first type of signal according to another embodiment of this application. A manner in which the terminal device switches from a normal working state to a sleep state in FIG. 7(A) and FIG. 7(B) is similar to that in FIG. 3. To be specific, if the terminal device detects no second type of signal, for example, DCI for scheduling data, in three consecutive slots in a normal state, the terminal device switches from the normal working state to the sleep state. In addition, similar to the example in FIG. 4, the terminal device determines, according to an indication in the first type of signal, a next location for monitoring the first type of signal. The example in FIG. 7(A) and FIG. 7(B) mainly focuses on a case in which a location for monitoring the first type of signal conflicts with a slot structure or an uplink-downlink configuration. In this case, the terminal device may search backwards for a second location that is not conflicted with, and blindly detect the first type of signal at the second location. For example, the second location may be a closest downlink or flexible slot after a location that is conflicted with.

In FIG. 7(A) and FIG. 7(B), assuming that a slot 4 is a predetermined location for monitoring the first type of signal, and the first indication information indicates that a location, in the slot 4, at which the terminal device monitors the first type of signal is an uplink location, the terminal device cannot monitor the first type of signal in the slot 4. In this case, the terminal device may search backward for a closest slot that does not conflict with a semi-statically configured or dynamically indicated slot structure, and blindly detect the first type of signal in the slot. As shown in FIG. 7(A) and FIG. 7(B), a slot structure of a slot 5 does not conflict with the semi-statically configured or dynamically indicated slot structure. Therefore, the terminal device blindly detects the first type of signal in the slot 5. The network device also knows that DCI serving as the first type of signal cannot be sent to the terminal device in the slot 4. Therefore, the network device also follows a same rule, and sends the DCI serving as the first type of signal to the terminal device in the slot 5.

It should be noted that, when the terminal device detects the first type of signal at the at least one second location, a meaning of the first type of signal at the second location is understood by using two understanding methods: In a first understanding method, a location at which the first type of signal is detected is used as a reference. As shown in FIG. 6(A) or FIG. 7(A), the first type of signal detected by the terminal device in a slot 5 indicates "scheduling may be performed after two slots". In this case, the terminal device starts to monitor the second type of signal in a slot 7 by using the current slot 5 as a reference. In a second understanding method, the first location at which the first-type signal should have been monitored is used as a reference. As shown in FIG. 6(B) or FIG. 7(B), the first type of signal detected by the terminal device in the slot 5 indicates that "scheduling may be performed after three slots". In this case, the terminal device starts to monitor the second type of signal in a slot 7 by using a slot 4 as a reference.

The following describes a case in which the terminal device does not detect the first type of signal. When the terminal device does not detect the first type of signal at a predetermined location, the terminal device may immediately switch from a sleep state to a normal working state, to start to monitor the second type of signal.

For example, the terminal device monitors the first type of signal in the downlink signal, and correspondingly, the network device sends the downlink signal, where the first type of signal is a signal used to indicate power consumption reduction information. The terminal device determines that the first type of signal is not detected at the first location in the time domain resource, where the first location is a predetermined location for monitoring the first type of signal. The terminal device start to monitor the second type of signal from a third location in the time domain resource, where the second type of signal is a signal used to indicate data scheduling, and the third location is located after the first location.

The first location at which the first type of signal is not detected may be a location for periodically monitoring the first type of signal, or may be a location for aperiodically monitoring the first type of signal. For example, the terminal device may determine, based on a currently received first signal, that a location of a next to-be-monitored first type of signal is the first location.

In this embodiment of this application, when the terminal device does not detect the first type of signal at the predetermined location, the terminal device may immediately monitor the second type of signal after the first location, in other words, may immediately switch from the sleep state to the normal working state, so as to avoid missing detection of a signal, thereby improving communication efficiency.

Figure 8:
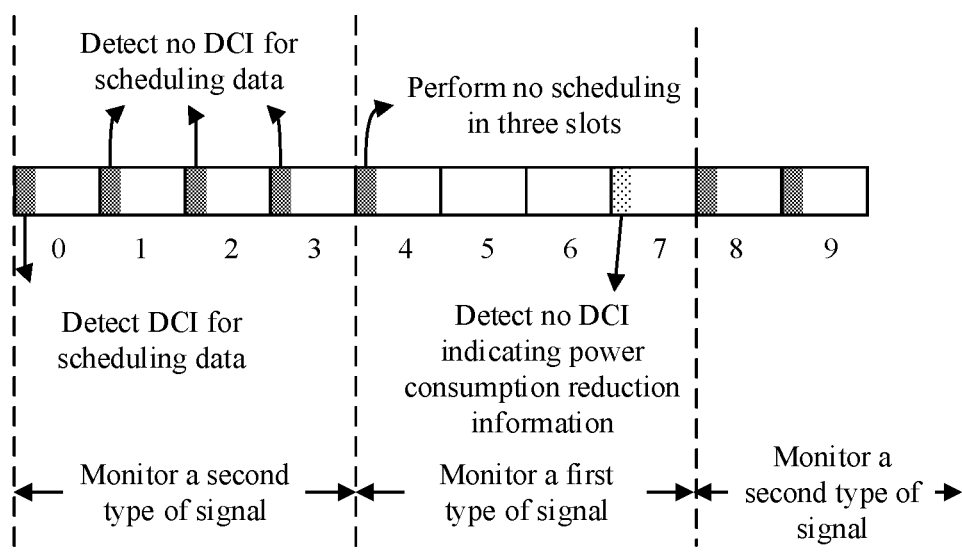
FIG. 8 is a flowchart of a process of a signal monitoring method according to another embodiment of this application.

FIG. 8 is a schematic diagram of a process of periodically monitoring a first type of signal according to another embodiment of this application. The example in FIG. 8 is applicable to a scenario of periodically monitoring the first type of signal, and is also applicable to a scenario of aperiodically monitoring the first type of signal. A manner in which the terminal device switches from a normal working state to a sleep state in FIG. 8 is similar to that in FIG. 3. To be specific, if the terminal device detects no second type of signal, for example, DCI for scheduling data, in three consecutive slots in a normal state, the terminal device switches from the normal working state to the sleep state. The example in FIG. 8 mainly focuses on a case in which the terminal device detects no first type of signal. In this case, the terminal device may immediately switch to the normal working state, and start to monitor the second type of signal, so as to avoid missing detection of a signal.

As shown in FIG. 8, the terminal device detects the first type of signal in a slot 4, and is notified that the terminal device is not scheduled to transmit data in next three slots including the current slot. If the terminal device periodically monitors the first type of signal, it is assumed that a period is configured as three slots, and a next location for monitoring the first type of signal is a slot 7. If the terminal device aperiodically monitors the first type of signal, the terminal device may determine, based on the first type of signal in the slot 4, that a next location for monitoring the first type of signal is the slot 7. Therefore, the terminal device does not monitor the first type of signal in a slot 5 and a slot 6, and monitors the first type of signal in the slot 7. If the terminal device detects no first type of signal in the slot 7, the terminal device starts to monitor the second type of signal from a next slot (that is, a slot 8), and stops monitoring the first type of signal. In other words, the terminal device switches from the sleep state to the normal working state. A reason why the terminal device detects no first type of signal at the predetermined monitoring location may be that a channel status is poor. For example, the network device sends the first type of signal, but the terminal device does not correctly receive the first type of signal. In this case, the terminal device cannot determine whether the network device expects the terminal device to start to monitor the second type of signal. To prevent a loss of possible information for scheduling data, the terminal device needs to immediately start to monitor the second type of signal.

Figure 9:
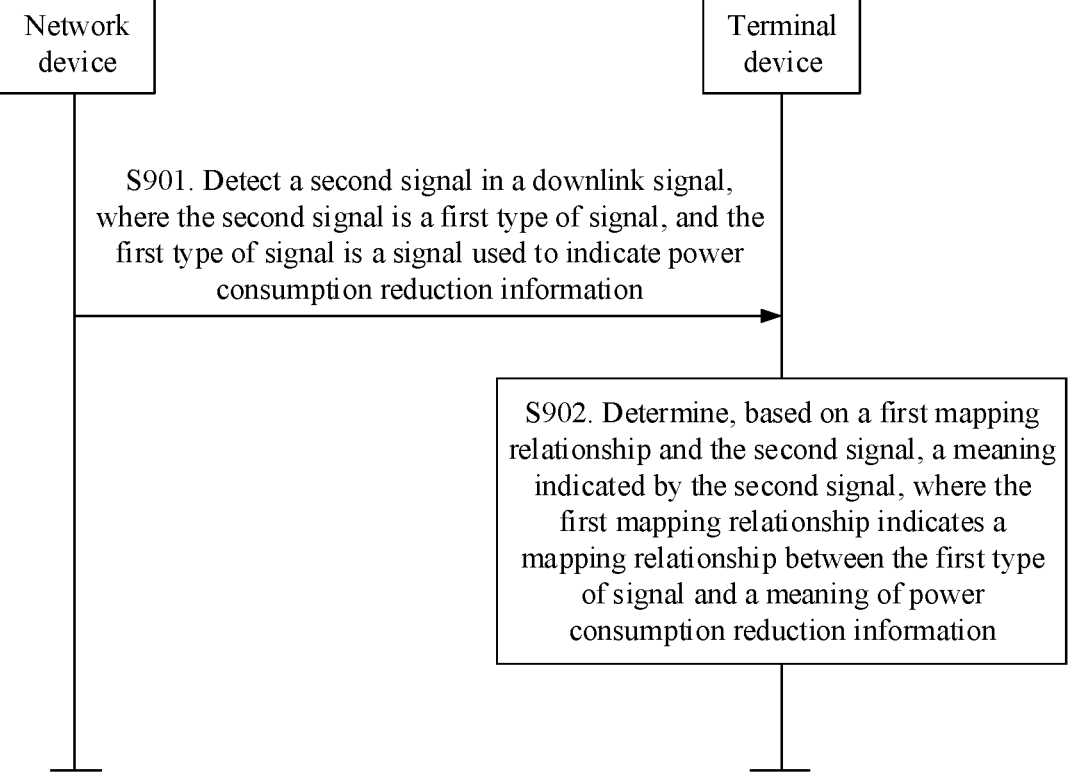
FIG. 9 is a flowchart of a signal monitoring method according to another embodiment of this application.

The following describes a signal monitoring method according to another embodiment of this application with reference to FIG. 9. The method may be performed by a terminal device and a network device, or the method may be performed by a chip of the terminal device or a chip of the network device. An example in which the method is performed by the terminal device and the network device is used as an example below for description. For content that is in the method in FIG. 9 and that is the same as or similar to the foregoing content, refer to the foregoing corresponding content. Details are not described herein again. The signal monitoring method includes the following steps:

S901. The terminal device detects a second signal in a downlink signal, and correspondingly, the network device sends the downlink signal to the terminal device, where the second signal is a first type of signal, and the first type of signal is a signal used to indicate power consumption reduction information.

S902. The terminal device determines, based on the second signal and a mapping relationship between the first type of signal and a meaning of power consumption reduction information, a meaning of power consumption reduction information that is indicated by the second signal.

The first type of signal may be DCI, a sequence, or a reference signal. The first type of signal may indicate different meanings of the power consumption reduction information. There is a mapping relationship between the first type of signal and different meanings of the power consumption reduction information. As an example, Table 1 to Table 3 schematically show the mapping relationship between the first type of signal and a meaning of the power consumption reduction information. As shown in Table 1 to Table 3, for example, if the first type of signal is DCI, different values assigned to the DCI may indicate different meanings of the power consumption reduction information. Alternatively, if the first type of signal is a sequence, different meanings of the power consumption reduction information may be indicated by different sequences. Alternatively, if the first type of signal is a reference signal, different meanings of the power consumption reduction information may be indicated by different reference signals.

Optionally, the meaning of the power consumption reduction information includes at least one of the following: data scheduling is not performed in a first time domain resource length; and data scheduling can be performed after a second time domain resource length. For other specific descriptions of the first type of signal, refer to the foregoing related content. Details are not described herein again.

Optionally, the first time domain resource length or the second time domain resource length is any one of the following: one or more slots, one or more subframes, one or more milliseconds, and one or more DRX cycles.

Optionally, the mapping relationship may be predefined, or may be indicated by the network device. For example, the network device may send third indication information to the terminal device, and correspondingly, the terminal device receives the third indication information from the network device. The third indication information is used to indicate the mapping relationship. In other words, the network device may indicate the mapping relationship between the first type of signal and a meaning to the terminal device in advance by using the third indication information. The network device may explicitly indicate the mapping relationship, or may implicitly indicate the mapping relationship.

For example, the third indication information may be semi-static indication information, or may be dynamic indication information.

In this embodiment of this application, the terminal device may determine, based on the mapping relationship between the first type of signal and a meaning of the power consumption reduction information, the meaning indicated by the detected second signal, so as to improve communication efficiency.

The first type of signal in this application may indicate one or more meanings of the power consumption reduction information. The terminal device may monitor a signal or perform another operation based on different meanings, so that the first type of signal can indicate more information content, thereby improving communication efficiency.

Optionally, the third indication information may be carried in RRC signaling.

FIG. 10 is a schematic flowchart of a signal monitoring method according to another embodiment of this application. The method in FIG. 10 describes a process in which a terminal device enters a sleep state from a normal working state. For content that is in the method in FIG. 10 and that is the same as or similar to the foregoing content, refer to the foregoing corresponding content. Details are not described herein again. As shown in FIG. 10, the method includes the following steps:

S1001. The terminal device determines whether a second type of signal is detected in a preset third time domain resource length, where the second type of signal is a signal used to indicate data scheduling.

S1002. The terminal device starts to monitor a first type of signal when the terminal device does not detect the second type of signal in the preset third time domain resource length, where the first type of signal is a signal used to indicate power consumption reduction information.

Optionally, the third time domain resource length may start from a location, in a time domain resource, at which the terminal device receives a second type of signal. For example, after receiving a second type of signal, the terminal device may monitor whether a new second type of signal can be detected in the third time domain resource length after the second type of signal. If the terminal device detects no new second type of signal, it indicates that a network device is to start to send the first type of signal. Therefore, the terminal device may immediately start to monitor the first type of signal after the third time domain resource length. Correspondingly, after sending a second type of signal, the network device may wait for the third time domain resource length, and then start to send the first type of signal.

Optionally, the terminal device does not monitor the first type of signal when monitoring the second type of signal.

Optionally, the terminal device does not monitor the first type of signal when detecting the second type of signal in the preset third time domain resource length.

In this embodiment of this application, when the network device does not send the second type of signal in the preset third time domain resource length, it indicates that the network device is to send the first type of signal. Therefore, the terminal device may monitor the first type of signal after the third time domain resource length, and the network device does not need to additionally send indication information that indicates to start to monitor the first type of signal, so as to reduce signaling overheads.

FIG. 11 is a schematic flowchart of a signal monitoring method according to another embodiment of this application. The method in FIG. 11 describes a process in which a terminal device enters a sleep state from a normal working state. For brevity, content or a concept in FIG. 11 that is the same as or similar to that in the foregoing content is not described herein again. As shown in FIG. 11, the method includes the following steps:

S1101. The terminal device receives second indication information from a network device, and correspondingly, the network device sends the second indication information to the terminal device, where the second indication information indicates the terminal device to start to monitor a first type of signal, and the first-type signal is a signal used to indicate power consumption reduction information.

S1102. The terminal device starts to monitor the first type of signal after receiving the second indication information, where the terminal device does not monitor a second type of signal when monitoring the first type of signal, and the second type of signal is a signal used to indicate data scheduling.

Optionally, the second indication information is carried in any one of the following: RRC signaling, a MAC CE, and DCI.

In this embodiment of this application, the terminal device starts to monitor the first type of signal after receiving the second indication information. Therefore, a manner in which the terminal device starts to monitor the first type of signal is provided, so as to improve communication efficiency.

Figure 12:
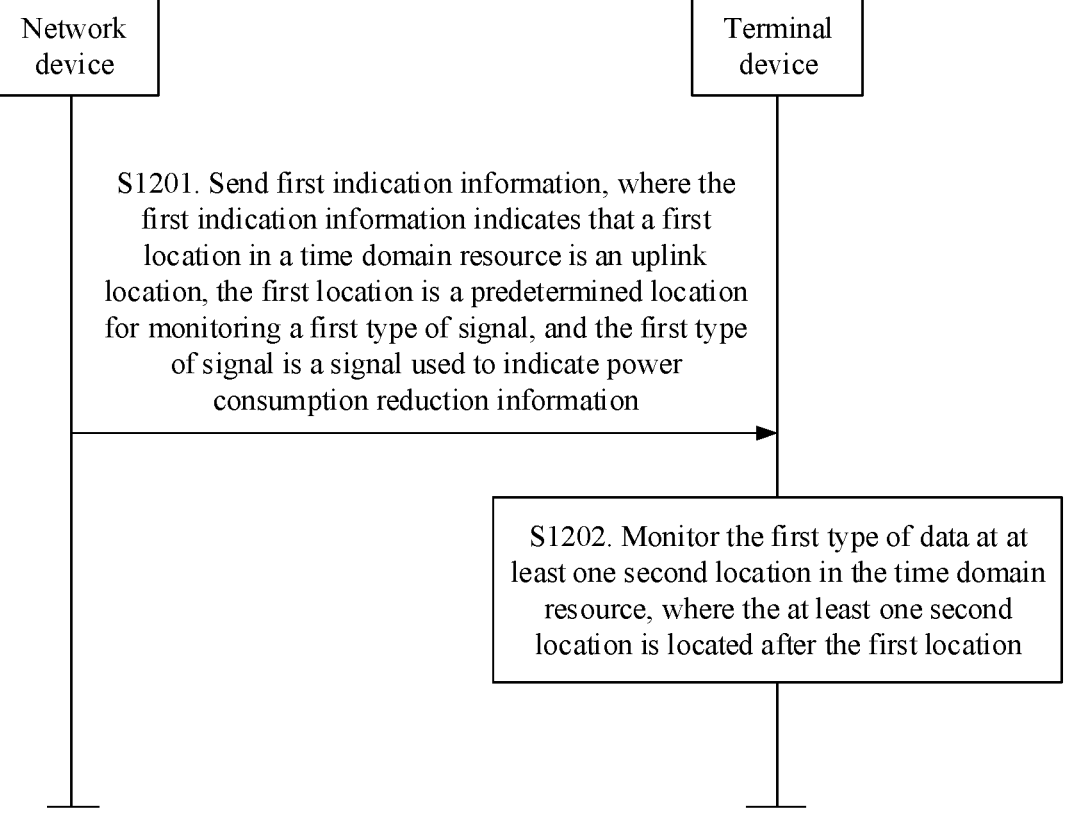
FIG. 12 is a flowchart of a signal monitoring method according to another embodiment of this application.

FIG. 12 shows a signal monitoring method according to another embodiment of this application. The method in FIG. 12 is a signal monitoring method when a location for monitoring a first type of signal conflicts with a slot structure or an uplink-downlink configuration. For brevity, content or a concept in FIG. 12 that is the same as or similar to that in the foregoing content is not described herein again. As shown in FIG. 12, the method includes the following steps:

S1201. A terminal device receives first indication information, and correspondingly, a network device sends the first indication information, where the first indication information indicates that a first location in a time domain resource is an uplink location, the first location is a predetermined location for monitoring a first type of signal, and the first type of signal is a signal used to indicate power consumption reduction information.

S1202. The terminal device monitors the first type of data at at least one second location in the time domain resource, where the at least one second location is located after the first location.

The first location may be a location for periodically monitoring the first type of signal, or may be a location for aperiodically monitoring the first type of signal.

In some examples, in a case of periodic monitoring, the first location is a location for periodically monitoring the first type of signal, and the at least one second location is located between the first location and a next location for periodically monitoring the first type of signal.

In some other examples, in a case of aperiodic monitoring, the method in FIG. 12 further includes: detecting, by the terminal device, a first signal, where the first signal is the first type of signal; and determining, by the terminal device based on the first signal, that a location of a next to-be-monitored first type of signal is the first location.

In this embodiment of this application, when a location for monitoring the first type of signal conflicts with a slot structure or an uplink-downlink configuration, the terminal device may monitor the first type of data at a location after the first location in the time domain resource, so as to provide a solution in a conflict scenario, thereby improving monitoring efficiency.

Figure 13:
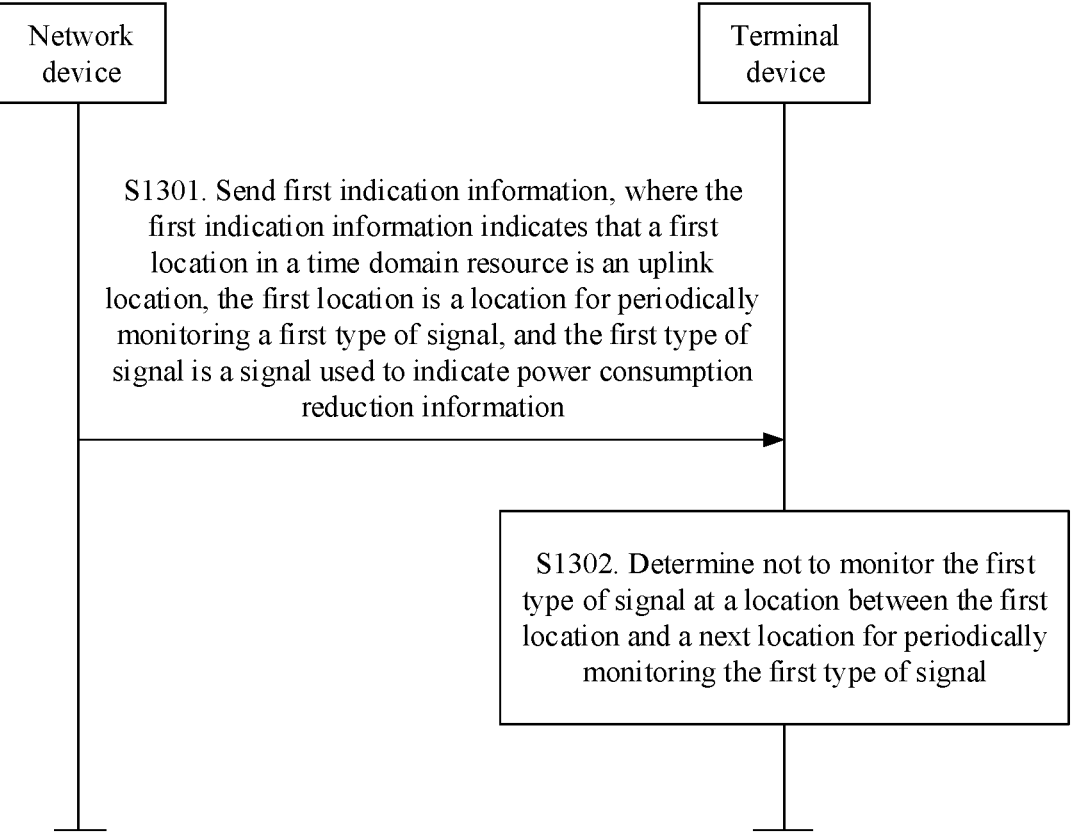
FIG. 13 is a flowchart of a signal monitoring method according to another embodiment of this application.

FIG. 13 shows a signal monitoring method according to another embodiment of this application. The method in FIG. 13 is a signal monitoring method when a location for monitoring a first type of signal conflicts with a slot structure or an uplink-downlink configuration. For brevity, content or a concept in FIG. 13 that is the same as or similar to that in the foregoing content is not described herein again. As shown in FIG. 13, the method includes the following steps:

S1301. The terminal device receives first indication information, and correspondingly, the network device sends the first indication information, where the first indication information indicates that a first location in a time domain resource is an uplink location, the first location is a location for periodically monitoring a first type of signal, and the first type of signal is a signal used to indicate power consumption reduction information.

S1302. The terminal device determines not to monitor the first type of signal at a location between the first location and a next location for periodically monitoring the first type of signal.

In this embodiment of this application, when a location for monitoring the first type of signal conflicts with a slot structure or an uplink-downlink configuration, the terminal device may start to monitor second type of data at a location after the first location in the time domain resource, so as to avoid missing detection of a signal, thereby improving monitoring efficiency.

FIG. 14 shows a signal monitoring method according to another embodiment of this application. The method in FIG. 14 is a signal monitoring method when a first type of signal is not detected at a predetermined location. For brevity, content or a concept in FIG. 14 that is the same as or similar to that in the foregoing content is not described herein again. As shown in FIG. 14, the method includes the following steps:

S1401. A terminal device monitors a first type of signal in a downlink signal, and correspondingly, a network device sends the downlink signal, where the first type of signal is a signal used to indicate power consumption reduction information.

S1402. The terminal device determines that the first type of signal is not detected at a first location in a time domain resource, where the first location is a predetermined location for monitoring the first type of signal.

S1403. The terminal device starts to monitor a second type of signal from a third location in the time domain resource, where the second type of signal is a signal used to indicate data scheduling, and the third location is located after the first location.

In this embodiment of this application, when the terminal device does not detect the first type of signal at the predetermined location, the terminal device may immediately monitor the second type of signal after the first location, in other words, may immediately switch from a sleep state to a normal working state, so as to avoid missing detection of a signal, thereby improving communication efficiency.

The foregoing describes the signal monitoring method in the embodiments of this application with reference to FIG. 1 to FIG. 14. The following describes an apparatus in the embodiments of this application with reference to FIG. 15 to FIG. 21.

FIG. 15 is a schematic block diagram of a terminal device 1500 according to an embodiment of this application. The terminal device 1500 can perform steps performed by the terminal device in the methods of this application. To avoid repetition, details are not described herein again. For example, the terminal device can perform the steps performed by the terminal device in FIG. 2, FIG. 11, FIG. 12, and FIG. 13. The terminal device 1500 may be a terminal device, or may be a chip applied to the terminal device. The terminal device 1500 includes a receiving unit 1510 and a monitoring unit 1520.

The receiving unit 1510 is configured to receive a downlink signal. The monitoring unit 1520 is configured to monitor a first type of signal in the downlink signal, where the first type of signal is a signal used to indicate power consumption reduction information, the terminal device does not monitor a second type of signal when monitoring the first type of signal, and the second type of signal is a signal used to indicate data scheduling.

Alternatively, the receiving unit 1510 is configured to receive second indication information from a network device, where the second indication information indicates the terminal device to start to monitor a first type of signal, and the first type of signal is a signal used to indicate power consumption reduction information. The monitoring unit 1520 is configured to start to monitor the first type of signal after the second indication information is received. The monitoring unit 1520 does not monitor a second type of signal when monitoring the first type of signal, where the second type of signal is a signal used to indicate data scheduling.

Alternatively, the receiving unit 1510 is configured to receive first indication information, where the first indication information indicates that a first location in a time domain resource is an uplink location, the first location is a predetermined location for monitoring a first type of signal, and the first type of signal is a signal used to indicate power consumption reduction information. The monitoring unit 1520 is configured to monitor the first type of data at at least one second location in the time domain resource, where the at least one second location is located after the first location.

Alternatively, the receiving unit 1510 is configured to receive first indication information, where the first indication information indicates that a first location in a time domain resource is an uplink location, the first location is a location for periodically monitoring a first type of signal, and the first type of signal is a signal used to indicate power consumption reduction information. The monitoring unit 1520 is configured to determine not to monitor the first type of signal at a location between the first location and a next location for periodically monitoring the first type of signal.

Figure 16:
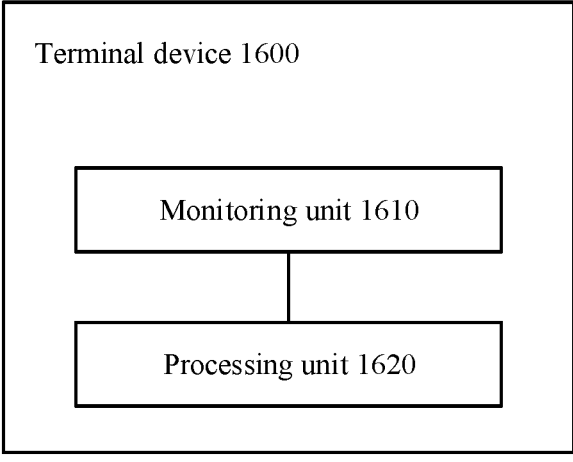
FIG. 16 is a schematic structural diagram of a terminal device according to another embodiment of this application.

FIG. 16 is a schematic block diagram of a terminal device 1600 according to an embodiment of this application. The terminal device 1600 can perform steps performed by the terminal device in the methods of this application. To avoid repetition, details are not described herein again. For example, the terminal device can perform the steps performed by the terminal device in FIG. 9, FIG. 10, and FIG. 14. The terminal device 1600 may be a terminal device, or may be a chip applied to the terminal device. The terminal device 1600 includes a monitoring unit 1610 and a processing unit 1620.

The monitoring unit 1610 is configured to detect a second signal in a downlink signal, where the second signal is a first type of signal, and the first type of signal is a signal used to indicate power consumption reduction information. The processing unit 1620 is configured to determine, based on the second signal and a mapping relationship between the first type of signal and a meaning of power consumption reduction information, a meaning of power consumption reduction information that is indicated by the second signal.

Alternatively, the processing unit 1620 is configured to determine whether a second type of signal is detected in a preset third time domain resource length, where the second type of signal is a signal used to indicate data scheduling. The monitoring unit 1610 is configured to start to monitor a first type of signal when the second type of signal is not detected in the preset third time domain resource length, where the first type of signal is a signal used to indicate power consumption reduction information.

Alternatively, the monitoring unit 1610 is configured to monitor a first type of signal in a downlink signal, where the first type of signal is a signal used to indicate power consumption reduction information. The processing unit 1620 is configured to determine that the first type of signal is not detected at a first location in a time domain resource, where the first location is a predetermined location for monitoring the first type of signal. The monitoring unit 1610 is configured to start to monitor a second type of signal from a third location in the time domain resource, where the second type of signal is a signal used to indicate data scheduling, and the third location is located after the first location.

Figure 17:
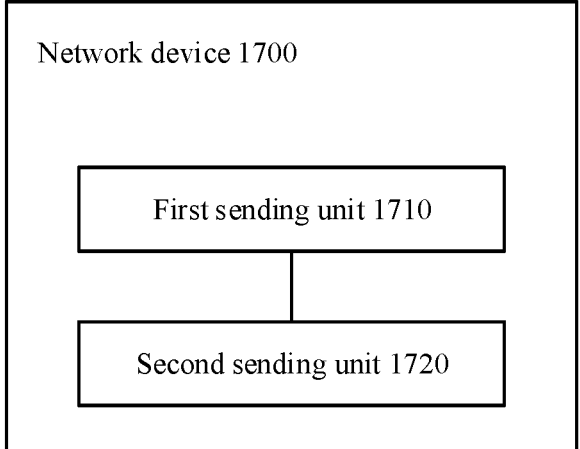
FIG. 17 is a schematic structural diagram of a network device according to an embodiment of this application.

FIG. 17 is a schematic block diagram of a network device 1700 according to an embodiment of this application. The network device 1700 can perform steps performed by the network device in the methods of this application. To avoid repetition, details are not described herein again. For example, the network device can perform the steps performed by the network device in FIG. 9, FIG. 10, FIG. 11, and FIG. 12. The network device 1700 may be a network device, or may be a chip applied to the network device. The network device 1700 includes a first sending unit 1710 and a second sending unit 1720.

The first sending unit 1710 is configured to send third indication information, where the third indication information is used to indicate a mapping relationship between a first type of signal and a meaning of power consumption reduction information, and the first type of signal is a signal used to indicate power consumption reduction information. The second sending unit 1720 is configured to send a second signal, where the second signal is the first type of signal.

Alternatively, the first sending unit 1710 is configured to send a second type of signal, where the second type of signal is a signal used to indicate data scheduling. The second sending unit 1720 is configured to start to send a first type of signal after a preset third time domain resource length, where the first type of signal is a signal used to indicate power consumption reduction information.

Alternatively, the first sending unit 1710 is configured to send second indication information, where the second indication information indicates a terminal device to start to monitor a first type of signal, and the first type of signal is a signal used to indicate power consumption reduction information. The second sending unit 1720 is configured to start to send the first type of signal after the second indication information is sent, where the second sending unit 1720 sends only one of the first type of signal and the second type of signal in a same time interval.

Alternatively, the first sending unit 1710 is configured to send first indication information, where the first indication information indicates that a first location in a time domain resource is an uplink location, the first location is a predetermined location of a first type of signal to be monitored by a terminal device, and the first type of signal is a signal used to indicate power consumption reduction information. The second sending unit 1720 is configured to send the first type of signal at a second location in the time domain resource, where the second location is located after the first location.

Figure 18:
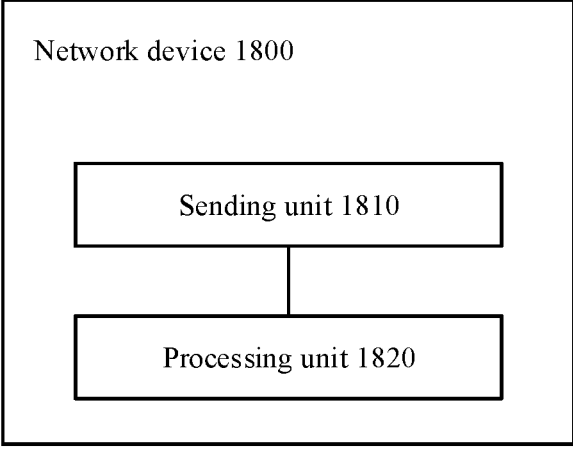
FIG. 18 is a schematic structural diagram of a network device according to another embodiment of this application.

FIG. 18 is a schematic block diagram of a network device 1800 according to an embodiment of this application. The network device 1800 can perform steps performed by the network device in the methods of this application. To avoid repetition, details are not described herein again. For example, the network device can perform the steps performed by the network device in FIG. 13. The network device 1800 may be a network device, or may be a chip applied to the network device. The network device 1800 includes a sending unit 1810 and a processing unit 1820.

The sending unit 1810 is configured to send first indication information, where the first indication information indicates that a first location in a time domain resource is an uplink location, the first location is a location for periodically sending a first type of signal, and the first type of signal is a signal used to indicate power consumption reduction information. The processing unit 1820 is configured to determine not to send the first type of signal at a location between the first location and a next location for periodically sending the first type of signal.

Figure 19:
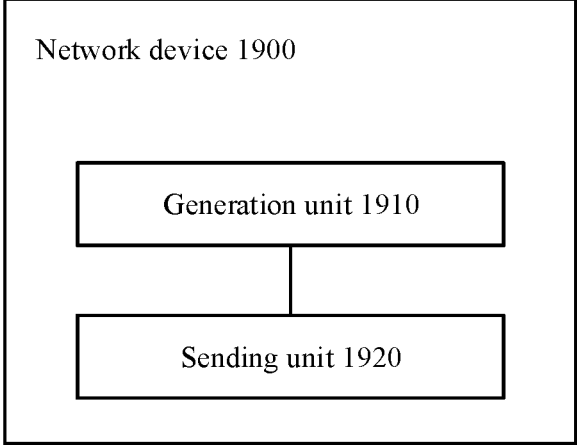
FIG. 19 is a schematic structural diagram of a network device according to another embodiment of this application.

FIG. 19 is a schematic block diagram of a network device 1900 according to an embodiment of this application. The network device 1900 can perform the steps performed by the network device in the methods of this application. To avoid repetition, details are not described herein again. For example, the network device can perform the steps performed by the network device in FIG. 2. The network device 1900 may be a network device, or may be a chip applied to the network device. The network device 1900 includes a generation unit 1910 and a sending unit 1920. The generation unit 1910 is configured to generate a downlink signal, where the downlink signal includes a first type of signal or a second type of signal that is to be monitored by a terminal device, the first type of signal is a signal used to indicate power consumption reduction information, and the second type of signal is a signal used to indicate data scheduling. The sending unit 1920 is configured to send the downlink signal, where the sending unit sends only one of the first type of signal and the second type of signal in a same time interval.

Figure 20:
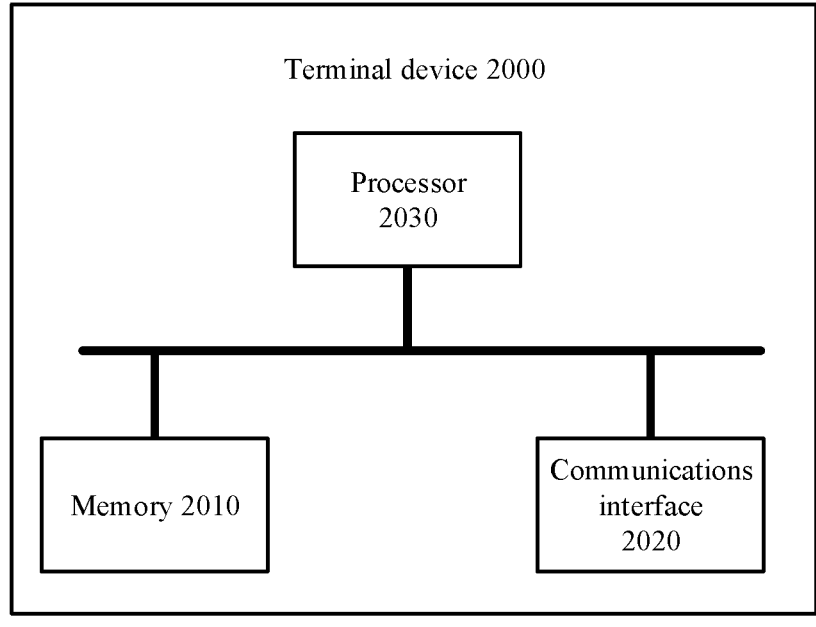
FIG. 20 is a schematic structural diagram of a terminal device according to another embodiment of this application.

FIG. 20 is a schematic structural diagram of a terminal device 2000 according to an embodiment of this application. As shown in FIG. 20, the terminal device 2000 includes one or more memories 2010, one or more communications interfaces 2020, and one or more processors 2030. The processor 2030 is configured to control the communications interface 2020 to receive and send a signal, and the memory 2010 is configured to store a computer program. The processor 2030 is configured to invoke the computer program from the memory 2010, and run the computer program, so that the terminal device performs a corresponding procedure and/or operation performed by the terminal device in the method embodiments of this application. For example, the terminal device 2000 can perform the steps performed by the terminal device in FIG. 2 and FIG. 9 to FIG. 14. For brevity, details are not described herein again.

Figure 21:
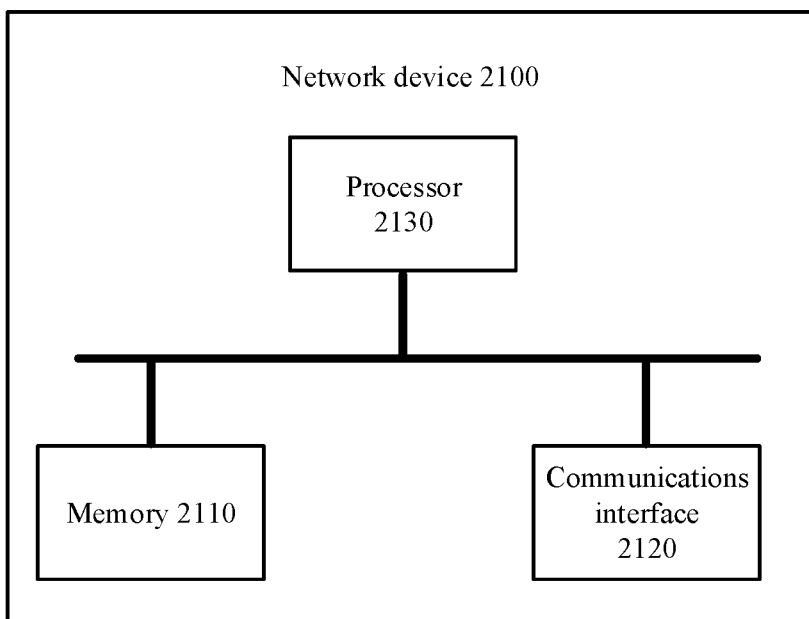
FIG. 21 is a schematic structural diagram of a network device according to another embodiment of this application.

FIG. 21 is a schematic block diagram of a network device 2100 according to an embodiment of this application. As shown in FIG. 21, the network device 2100 includes one or more memories 2110, one or more communications interfaces 2120, and one or more processors 2130. The processor 2130 is configured to control the communications interface 2120 to receive and send a signal, and the memory 2110 is configured to store a computer program. The processor 2130 is configured to invoke the computer program from the memory 2110, and run the computer program, so that the network device 2100 performs a corresponding procedure and/or operation performed by the network device in the communication method embodiments of this application. For example, the network device 2100 can perform the steps performed by the network device in FIG. 2 and FIG. 9 to FIG. 13. For brevity, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one location, or may be distributed on a plurality of network units. Some or all of the units may be selected based on actual requirements to achieve the objectives of the solutions of the embodiments.

In addition, function units in the embodiments of this application may be integrated into one processing unit, or each of the units may independently exist physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A terminal device, comprising:
at least one processor; and
a memory coupled to the at least one processor and configured to store programming instructions that, when executed by the at least one processor, cause the terminal device to:
detect a second signal in a downlink signal, where the second signal is a first type of signal, and the first type of signal is a downlink control information (DCI) and the first type of signal indicates power consumption reduction information; and
determine, based on the second signal and a mapping relationship between at least one bit value in the first type of signal and at least one power consumption reduction information, that the power consumption reduction information indicated by the second signal indicates the following:
that the terminal device does not monitor a second type of signal in a first time resource length, wherein the second type of signal is a signal that indicates data scheduling, and that the terminal device does not monitor the second type of signal in the first time resource length comprises:
that the terminal device does not monitor the second type of signal in a first search space in the first time resource length, and that the terminal device monitors the second type of signal in a second search space in the first time resource length.

2. The terminal device of claim 1, wherein the programming instructions that, when executed by the at least one processor, further cause the terminal device to:
receive third indication information from a network device, wherein the third indication information indicates the mapping relationship, and the third indication information is carried in radio resource control (RRC) signaling.

3. The terminal device of claim 1, wherein the first time resource length is a first length when the bit value in the first type of signal is a first value, and the first time resource length is a second length when the bit value in the first type of signal is a second value.

4. The terminal device of claim 1, wherein the first time resource length is one or more slots.

5. The terminal device of claim 1, wherein the programming instructions that, when executed by the at least one processor, further cause the terminal device to:
receive first indication information, where the first indication information indicates that a first location in a time domain resource is an uplink location, and the first location is a location for periodically monitoring the first type of signal; and
determine not to monitor the first type of signal at a location between the first location and a next location for periodically monitoring the first type of signal.

6. A network device, comprising:
at least one processor; and
a memory coupled to the at least one processor and configured to store programming instructions that, when executed by the at least one processor, cause the network device to:
determine a second signal, where the second signal is a first type of signal, and the first type of signal is a downlink control information (DCI) and the first type of signal indicates power consumption reduction information, and wherein there is a mapping relationship between bit value in the first type of signal and the power consumption reduction information;

wherein the power consumption reduction information indicates the following:

that a terminal device does not monitor a second type of signal in a first time resource length, wherein the second type of signal is a signal that indicates data scheduling, and the terminal device does not monitor the second type of signal in the first time resource length comprises:

that the terminal device does not monitor the second type of signal in a first search space in the first time resource length, and that the terminal device monitors the second type of signal in a second search space in the first time resource length; and send a second signal in a downlink signal to a terminal device.

7. The network device of claim 6, wherein the programming instructions that, when executed by the at least one processor, cause the network device to:

send third indication information, wherein the third indication information indicates the mapping relationship, and the third indication information is carried in radio resource control (RRC) signaling.

8. The network device of claim 6, wherein the first time resource length is a first length when the bit value in the first type of signal is a first value, and the first time resource length is a second length when the bit value in the first type of signal is a second value.

9. The network device of claim 8, wherein the first time resource length is one or more slots.

10. The network device of claim 6, wherein the programming instructions that, when executed by the at least one processor, cause the network device to:

send first indication information, where the first indication information indicates that a first location in a time domain resource is an uplink location, and the first location is a location for periodically monitoring the first type of signal; and determine not to send the first type of signal at a location between the first location and a next location for periodically monitoring the first type of signal.

11. A non-transitory computer readable storage medium, wherein the computer readable storage medium stores a computer program, and when the computer program is run, cause a device to:

detect a second signal in a downlink signal, where the second signal is a first type of signal, and the first type of signal is a downlink control information (DCI) and the first type of signal indicates power consumption reduction information; and determine, based on the second signal and a mapping relationship between at least one bit value in the first type of signal and at least one meaning of the power consumption reduction information, that the power consumption reduction information indicated by the second signal indicates the following:

that the device does not monitor a second type of signal in a first time resource length, wherein the second type of signal is a signal that indicates data scheduling, and that the device does not monitor the second type of signal in the first time resource length comprises:

that the device does not monitor the second type of signal in a first search space in the first time resource length, and that the device monitors the second type of signal in a second search space in the first time resource length.

12. The computer readable storage medium of claim 11, wherein when the computer program is run, further cause the device to:

receive third indication information from a network device, wherein the third indication information indicates the mapping relationship, and the third indication information is carried in radio resource control (RRC) signaling.

13. The computer readable storage medium of claim 11, wherein the first time resource length is a first length when the bit value in the first type of signal is a first value, and the first time resource length is a second length when the bit value in the first type of signal is a second value.

14. The computer readable storage medium of claim 13, wherein the first time resource length is one or more slots.

15. The computer readable storage medium of claim 11, wherein when the computer program is run, further cause the device to:

receive first indication information, where the first indication information indicates that a first location in a time domain resource is an uplink location, and the first location is a location for periodically monitoring the first type of signal; and determine not to monitor the first type of signal at a location between the first location and a next location for periodically monitoring the first type of signal.

* * * * *